US012598175B2

(12) United States Patent
Olden et al.

(10) Patent No.: US 12,598,175 B2
(45) Date of Patent: Apr. 7, 2026

(54) SYSTEMS, METHODS, AND STORAGE MEDIA FOR ADMINISTRATION OF IDENTITY MANAGEMENT SYSTEMS WITHIN AN IDENTITY INFRASTRUCTURE

(71) Applicant: Strata Identity, Inc., Niwot, CO (US)

(72) Inventors: Eric Olden, Niwot, CO (US); Christopher Marie, San Juan, PR (US); Carl Eric Leach, San Diego, CA (US)

(73) Assignee: Strata Identity, Inc., Niwot, CO (US)

( * ) Notice: Subject to any disclaimer, the term of this patent is extended or adjusted under 35 U.S.C. 154(b) by 499 days.

(21) Appl. No.: 17/955,101

(22) Filed: Sep. 28, 2022

(65) Prior Publication Data

US 2024/0114019 A1 Apr. 4, 2024

Related U.S. Application Data

(63) Continuation-in-part of application No. 17/217,422, filed on Mar. 30, 2021, now Pat. No. 11,973,749.
(Continued)

(51) Int. Cl.
*G06F 7/04* (2006.01)
*H04L 9/40* (2022.01)

(52) U.S. Cl.
CPC .................................. *H04L 63/083* (2013.01)

(58) Field of Classification Search
CPC ..... H04L 9/0866; H04L 9/32; H04L 63/0876; H04L 63/083; G06F 21/1014; G06F 21/30; G06F 21/31
See application file for complete search history.

(56) References Cited

U.S. PATENT DOCUMENTS

2012/0260322 A1* 10/2012 Logan ..................... G06F 21/33
726/6
2018/0007722 A1* 1/2018 Cohn ..................... H04W 8/005
(Continued)

OTHER PUBLICATIONS

Faraji et al, Identity Access Management for Multi-tier Cloud Infrastructure, May 9, 2014, IEEE, pp. 1-9. (Year: 2014).*
(Continued)

*Primary Examiner* — Philip J Chea
*Assistant Examiner* — Jenise E Jackson
(74) *Attorney, Agent, or Firm* — NOD Law PC

(57) ABSTRACT

Systems, methods, and storage media for controlling access to an application in an identity infrastructure are disclosed. The method comprises requesting to access the application, wherein the application is associated with an identity system, determining a status of the identity system, the status comprising one of an available status and unavailable status. When the status comprises the unavailable status, transmitting a request for additional information, receiving the additional information, and verifying the additional information by referencing an identity cache associated with the identity system. In some cases, the method comprises authenticating a user to access the application when the status comprises the available status and/or the additional information has been verified, and in response to authenticating the user at the application, sending a communication from the application to the user, granting the user access to the application.

18 Claims, 10 Drawing Sheets

Related U.S. Application Data

(60) Provisional application No. 63/002,921, filed on Mar. 31, 2020.

(56) References Cited

U.S. PATENT DOCUMENTS

| | | | |
|---|---|---|---|
| 2018/0314817 A1* | 11/2018 | Gadde | G06F 21/6218 |
| 2019/0174312 A1* | 6/2019 | Cho | H04W 12/06 |
| 2021/0149356 A1* | 5/2021 | Unagami | G06Q 10/02 |
| 2021/0306325 A1 | 9/2021 | Olden et al. | |

OTHER PUBLICATIONS

Tuecke et al, Globus Auth: A Research Identity and Access Management Platform, Oct. 27, 2016, pp. 203-212. (Year: 2016).*

* cited by examiner

100

Server(s) 102

Electronic
Storage 134

Processor(s) 136

Machine-Readable Instructions 106

Agent Element Installment Module 108

Identity Infrastructure Assessment Module
110

Identity Fabric Installment Module 112

Data Receiving Module 114

Control Plane Operation Managing Module
116

Configuration Agent Managing Module 118

Element Agent Detection Module 120

Identity Data Assessment Module 122

Message Authentication Module 124

Message Checking Module 126

Message Authorizing Module 128

Identity Data Moving Module 130

Identity Cache Module 191

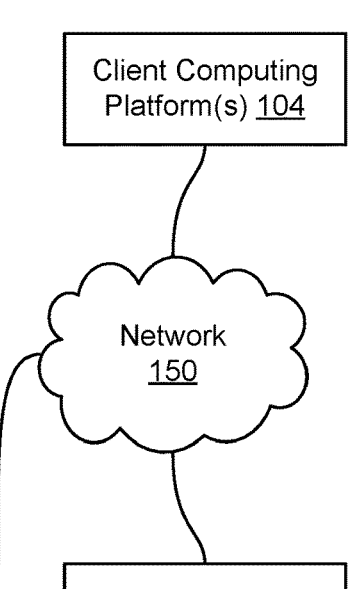

Client Computing
Platform(s) 104

Network
150

External Resources
132

Table 1: Identity Infrastructure Reference Architecture

| Agent/Element | Description | Location in Identity Infrastructure |
|---|---|---|
| Discovery Agent | Reports details about identity infrastructure; identifies agents for installing in identity fabric; identifies location for installing controller agent | A server (e.g., Apache or Nginx server); a control element of an identity system (e.g., OAM server) |
| Controller Agent | Manages agents/elements of identity infrastructure | Anywhere; on or adjacent to a server, or servers where other identity fabric elements are deployed |
| Orchestrating Agent | Installed as a proxy within the flow of identity data and identity metadata; directs flow of identity data through identity fabric | Anywhere; on or adjacent to a server associated with an identity system |
| Fabric Connector | Facilitates communication with different identity domains or identity systems; added to (or works in conjunction with) an orchestrating agent | Between an orchestrating agent and a server associated with an identity system |
| Monitoring Agent | Assists in managing the flow of identity data and/or identity metadata through the identity fabric; monitors events | Anywhere; on or adjacent to a server or servers where other identity fabric elements are deployed. |
| Configuration Agent | Assists in managing the flow of identity data and/or identity metadata through the identity fabric | Anywhere; on or adjacent to a server or servers where other identity fabric elements are deployed. |

SYSTEMS, METHODS, AND STORAGE MEDIA FOR ADMINISTRATION OF IDENTITY MANAGEMENT SYSTEMS WITHIN AN IDENTITY INFRASTRUCTURE

CROSS-REFERENCE TO RELATED APPLICATIONS

The present Application for Patent is a continuation in part of U.S. application Ser. No. 17/217,422, filed Mar. 30, 2021, entitled "Systems, Methods, and Storage Media for administration of Identity Management Systems within an Identity Infrastructure," which claims priority to U.S. Provisional Application No. 63/002,921, filed Mar. 31, 2020, and assigned to the assignee hereof, which is hereby expressly incorporated by reference herein.

FIELD OF THE DISCLOSURE

The present disclosure relates to systems, methods, and storage media for administration of identity management systems within an identity infrastructure. Specifically, but not intended to limit the disclosure, the present disclosure relates to one or more systems, methods, and/or devices that enable centralized configuration and administration of disparate identity management systems.

BACKGROUND

An identity management system refers to computing platforms implementing a set of technologies used for controlling individual identities, their authentication, authorization, roles and privileges within or across the system and any enterprise boundaries associated with the system. These identity management systems are utilized to increase security within the system and enterprise boundaries, thereby increasing productivity, while decreasing cost, downtime, and repetitive tasks.

Types of functions provided by an identity management system include digital file access control, password management, provisioning of services within the network; enabling single sign-on (SSO), managing security tokens; and mitigating risk, among others. To provide these features, identity management systems frequently use identifiers comprising data used to identify a subject, credentials comprising evidence to support for claims about identities or parts thereof, and attributes comprising characteristics of a subject.

Since many entities utilize multiple third-party providers of cloud services, there is increased fragmentation, layering, and dispersion of identity management within single organizations that utilize multiple services. This fragmentation, layering, and dispersion of identity management can create a cumbersome system to effectively administer.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

For the purposes of this disclosure, the term "authentication" may refer to the process of verifying who a user is (i.e., to confirm that users are who they say they are), while the term "authorization" may refer to the process of verifying what a user has access to (e.g., access to a resource, such as an app, a document, a database, etc.). The terms "identity system", "identity provider", and "identity domain" may be used interchangeably for the purposes of this disclosure. Additionally, the terms "orchestrating agent" and "orchestrator" may also be used interchangeably throughout the disclosure.

Given the number and complexity of separate identity management systems utilized by a single organization, consolidating the administration of these identity management systems is difficult. However, described herein are systems, methods, and storage media for administering numerous distinct identity management systems. In some aspects, the present disclosure also relates to systems, methods, and storage media for controlling user access to an application. Specifically, but not intended to limit the disclosure, the present disclosure relates to one or more systems, methods, and/or devices that enable the use of a caching technique for caching identity data and/or identity metadata to an identity cache module to provide resilient identity operations during an outage at an identity system/provider, where the identity system or provider is typically utilized (e.g., if available/online) for accessing the application, as further described below in relation to FIGS. 3A-B, 4, 6, 8, and/or 9.

Specifically, one aspect disclosed herein relates to systems, methods, and/or devices that enable the centralized configuration and management of disparate identity management systems. It introduces systems elements such as executable scripts and code (i.e., workers and proxies) that assist in the overall management (i.e., meta-management) of identity information to facilitate the orchestration, integration, and abstraction of identity data and metadata. In some cases, Discovery Agents may be installed within an existing Identity Infrastructure (e.g., systems 316 seen in FIG. 3A), wherein the Discovery Agents may be configured to report back details about the existing Identity Infrastructure. In some embodiments, Discovery Agents may also help identity one or more Identity Fabric elements, (as described in Paragraph 0023 and elsewhere), also referred to herein as identity fabric agents, "elements", and/or "agents", for installing and/or may identify one or more locations for installing Controller Agent(s) to manage at least a portion of the elements installed (it is contemplated that the one or more of the Identity Fabric elements and the agents described herein may be hereinafter referred to as the "Identity Fabric"). Alternatively, in lieu of a Controller Agent, each element may be configured and managed directly. In some embodiments, Orchestrating Agents may be installed and placed as proxies and orchestrators within the flow of Identity Data (e.g., authentication and authorization requests, managing users, setting and reading user attributes) and Identity Metadata (e.g., setting, editing, and reading access policies, password rules, data locations, rules controlling user administration tasks and the hierarchy delegation of those tasks, rules for assigning user memberships in groups, roles, etc., and rules or policies to determine the assignment of accounts to users) of the existing system or identity infrastructure. Additional types of Identity Data may comprise security token registration and/or presentation, registration of user devices, user metrics used to inform authentication and/or authorization decisions, and session tokens. Such user metrics may include information related to the user at the time the user provides a request. For example, a user's current IP address, the configuration of a user device including any extensions used by a user, and behavioral data (e.g., how quickly a user types, implied velocity a user has traveled since a previous authentication attempt, which may be based upon the geographic locations of each authentication attempt) or risk data (how a user's current behavior compares to a similar cohort of users, how many times a user has attempted to authenticate over a period of time) may all comprise such user metrics.

Decisions about when and how to authenticate or authorize access are based on these conditions, and so are not "fixed" by attributes that are known about the user in advance. In some cases, Fabric Connectors may be added to the Orchestrating Agents to facilitate communication with Identity Domains of different types. Furthermore, Monitoring Agents and Configuration Agents may be added to the identity infrastructure to assist in the management of the flow of Identity Data and Identity Metadata. In some examples, event data may be collected from the one or more elements of the Identity Fabric and made available for audit and/or compliance.

One aspect of the present disclosure relates to a system configured for management of identity management systems (e.g., systems 316 seen in FIG. 3A) in an identity infrastructure (e.g., architecture 301-*a* in FIG. 3A). The system may include one or more hardware processors configured by machine-readable instructions. The processor(s) may be configured to install at least one discovery agent element in the identity infrastructure. The identity infrastructure may include one or more identity domains (which may comprise, include, be a part of, or otherwise incorporate identity systems 316 seen in FIG. 3A). The at least one discovery agent element may be installed on or adjacent to an identity infrastructure element in the identity infrastructure (e.g., systems 316 seen in FIG. 3A). The processor(s) may be configured to assess, via information provided by the at least one discovery agent element, the identity infrastructure. The assessing may include one or more of detecting and reporting identity data and identity metadata from the identity infrastructure, the current hardware in the identity infrastructure, and the identity infrastructure network components and network communication configuration, and identifying one or more identity fabric elements or agents for installing. The identity data may include one or more of a user identity, a user credential, and a user attribute for one or more individual users of the one or more identity domains, or other data as described herein. The identity metadata may include one or more of a password rule, an authorization policy, an authentication policy, a trust policy, and network locations for identity domain elements of the one or more identity domains, or other data as described herein. The processor(s) may be further configured to install the identified identity fabric elements in the identity infrastructure based at least in part on the assessing. The identity fabric elements may include the one or more elements or agents in communication with each other. The elements or agents may be selected from a group comprising orchestrating agents, fabric connectors utilizing a common application programming interface for communications with the one or more identity domains, controller elements, configuration agents, and monitoring agents. At least one element or agent may be configurable into another type of element or agent or as more than one type of element or agent. This may happen when new identity systems 316 are discovered, when network infrastructure changes, and/or when system administrators need to alter the architecture/infrastructure of the identity fabric. The processor(s) may be configured to receive one or more data flows pertaining to identity data or identity metadata for at least one identity domain. The one or more data flows may be linked to at least one event. Events may comprise user authentication and authorization, changes in policy, requests for user attribute information, changes to user attributes or identity metadata, addition of user identity and attribute stores, connections to and exchange of metadata with 3rd party identity providers (from outside of the enterprise boundary), changes (create/update/delete) to user administration policies and configuring integration between the identity system and supplemental systems. One such supplemental system may comprise a system that manages user metrics. Such a system may gather information about a user's current behavior, compare the information to a cohort of similar users, and place the user within a percentile, based on the similarity of the user's behavior to the identified cohort. In one such example, if a user's behavior across an identified period of time is the same as, or greater than, the behavior of an identified percentage of the comparative cohort, the user will be identified as "low risk" and granted access, "medium risk", or "high risk". One such identified period of time may comprise a configurable period of time and may include an "impossible" period of time setting. An example of an impossible period of time may comprise a distance greater than an allowed distance for the time between access attempts. The allowed distance may be based upon a maximum speed to travel between two locations. In one example, a first access attempt using a New York, NY geographical location and a second access attempt five minutes after the first access attempt using a Los Angeles, CA geographical location would comprise such an impossible period of time. A user may be denied access if they are identified as high risk and allowed access if they are low risk. A configurable action may occur for medium risk as well. The percentage similarity for low risk may be 85%, although each of the percentages for determining "low", "medium", and "high" risk are configurable.

In the example above, a supplemental system would gather information about the user's current behavior and compare that to a cohort of similar users and determine things such as a percentage (%) comparison. This person's current behavior is similar to the behavior of 85% of the comparative cohort and therefore represents a relative risk that is represented by some scale (low-medium-high, or number is scale of 1-100). Change in policy may be related to policy changes affecting how to authenticate or authorize users trying to access applications, services, or other resources or may be related to controlling the actions of the administrators of the identity system itself. Administrator policies may determine the privileges and permissions a given identity administrator has when interacting with the identity system. For example, such policies may determine whether the administrator can change a user's authentication policies that control access to applications, services or other resources.

The other are policies that control the actions of the administrators of the identity system itself. These policies determine the privileges and permissions a given identity administrator has when interacting with the identity system, for example whether he/she can change the authentication policies that control the end user's access to applications, services or other resources. The processor(s) may be configured to manage, by the controller element, control plane operations across the one or more elements or agents. The processor(s) may be configured to manage, by at least one of the orchestrating agents, the configuration agent and the monitoring agent. The one or more data flows may flow through the identity fabric or via the fabric connectors. The processor(s) may be configured to detect and monitor, by the one or more elements or agents of the identity fabric, the at least one event linked to the one or more data flows. The processor(s) may be configured to assess the identity data or metadata and an identity data or metadata state across the one or more identity domains in the identity infrastructure based at least in part on the detecting and monitoring.

Another aspect of the present disclosure relates to a method for management of identity management systems in an identity infrastructure. The method may include installing at least one discovery agent element in the identity infrastructure. The identity infrastructure may include one or more identity domains. The at least one discovery agent element may be installed on or adjacent to an identity infrastructure element in the identity infrastructure. The method may include assessing, by the at least one discovery agent element, the identity infrastructure. The assessing may include one or more of detecting and reporting identity data and identity metadata from the identity infrastructure and identifying one or more elements or agents for installing. The identity data may include one or more of a user identity, a user credential, and a user attribute for one or more individual users of the one or more identity domains. The identity metadata may include one or more of a password rule, an authorization policy, an authentication policy, a trust policy, and network locations for identity domain elements of the one or more identity domains. The method may include installing identity fabric elements in the identity infrastructure based at least in part on the assessing. The identity fabric elements may include the one or more elements or agents in communication with each other. The elements or agents may be selected from a group consisting of orchestrating agents, fabric connectors utilizing a common application programming interface for communications with the one or more identity domains, controller elements, configuration agents, monitoring agents, and additional discovery agents. At least one element or agent may be configurable into another type of element or agent or as more than one type of element or agent. The method may include receiving, at the identity infrastructure, one or more data flows pertaining to identity data or identity metadata for at least one identity domain. The one or more data flows may be linked to at least one event. The method may include managing, by the controller element, control plane operations across the one or more elements or agents. The method may include managing, by at least one of the orchestrating agent, the configuration agent and the monitoring agent, the one or more data flows, where the one or more data flows may flow through the identity fabric or via the fabric connectors. The method may include detecting and monitoring, by the one or more elements or agents of the identity fabric, the at least one event linked to the one or more data flows. The method may include assessing the identity data or metadata and an identity data or metadata state across the one or more identity domains in the identity infrastructure based at least in part on the detecting and monitoring.

Yet another aspect of the present disclosure relates to a non-transient computer-readable storage medium having instructions embodied thereon, the instructions being executable by one or more processors to perform a method for management of identity management systems in an identity infrastructure. The method may include installing at least one discovery agent element in the identity infrastructure. The identity infrastructure may include one or more identity domains. The at least one discovery agent element may be installed on or adjacent to a critical identity infrastructure element in the identity infrastructure. The method may include assessing, by the at least one discovery agent element, the identity infrastructure. The assessing may include one or more of detecting and reporting identity data and identity metadata from the identity infrastructure and identifying one or more elements or agents for installing. The identity data may include one or more of a user identity, a user credential, and a user attribute for one or more individual users of the one or more identity domains. The identity metadata may include one or more of a password rule, an authorization policy, an authentication policy, a trust policy, and network locations for identity domain elements of the one or more identity domains. The method may include installing an identity fabric in the identity infrastructure based at least in part on the assessing. The identity fabric may include the one or more elements or agents in communication with each other. The elements or agents may be selected from a group consisting of orchestrating agents, fabric connectors utilizing a common application programming interface for communications with the one or more identity domains, controller elements, configuration agents, and monitoring agents. At least one element or agent may be configurable into another type of element or agent or as more than one type of element or agent. The method may include receiving, at the identity infrastructure, one or more data flows pertaining to identity data or identity metadata for at least one identity domain. The one or more data flows may be linked to at least one event. The method may include managing, by the controller element, control plane operations across the one or more elements or agents. The method may include managing, by at least one of the orchestrating agent, the configuration agent and the monitoring agent. The one or more data flows may flow through the identity fabric or via the fabric connectors. The method may include detecting and monitoring, by the one or more elements or agents of the identity fabric, the at least one event linked to the one or more data flows. The method may include assessing the identity data or metadata and an identity data or metadata state across the one or more identity domains in the identity infrastructure based at least in part on the detecting and monitoring.

Another aspect of the present disclosure relates to a system configured for controlling access to an application, the system comprising one or more hardware processors configured by machine-readable instructions to: request access to the application, wherein the application is associated with an identity system; determine a status of the identity system, the status comprising one of an available status and unavailable status, wherein when the status comprises the unavailable status, the system transmits a request for additional information, receives the additional information, and verifies the additional information by referencing an identity cache associated with the identity system. In some implementations, the one or more hardware processors are further configured by machine-readable instructions to authenticate a user to access the application when the status comprises the available status and/or the additional information has been verified. In some implementations, the one or more hardware processors are further configured by machine-readable instructions, in response to authenticating the user at the application, to send a communication from the application to the user, granting the user access to the application.

Another aspect of the present disclosure relates to a method for controlling access to an application, the method comprising: requesting to access the application, wherein the application is associated with an identity system; determining a status of the identity system, the status comprising one of an available status and unavailable status; and, when the status comprises the unavailable status: transmitting a request for additional information, receiving the additional information, and verifying the additional information by referencing an identity cache associated with the identity system. In some implementations, the method further comprises authenticating a user to access the application when the status comprises the available status and/or the additional information has been verified. In some implementations, the method yet further comprises, in response to authenticating the user at the application, sending a communication from the application to the user and granting the user access to the application.

Another aspect of the present disclosure relates to a non-transient computer-readable storage medium having instructions embodied thereon, the instructions being executable by one or more processors to perform a method for controlling access to an application, the method comprising: requesting to access the application, wherein the application is associated with an identity system; determining a status of the identity system, the status comprising one of an available status and unavailable status, and, when the status comprises the unavailable status: transmitting a request for additional information, receiving the additional information, and verifying the additional information by referencing an identity cache associated with the identity system. In some implementations, the method further comprises authenticating a user to access the application when at least one of: the status comprises the available status and the additional information has been verified. In some implementations, the method yet further comprises, in response to authenticating the user at the application, sending a communication from the application to the user and granting the user access to the application.

In some implementations of the system, the method, and the non-transient computer-readable storage medium described herein, requesting to access the application comprises receiving the request at an orchestrating agent prior to determining a status of the identity system, determining a status of the identity system comprises using the orchestrating agent to determine the status of the identity system, and when the status comprises the available status, authenticating the user comprises: receiving identity data at the identity system from the user, authenticating the user at the identity system based at least in part on the identity data, and receiving a user authentication confirmation at the orchestrating agent.

In some implementations of the system, the method, and the non-transient computer-readable storage medium described herein, verifying the additional information by referencing an identity cache comprises using the orchestrating agent to reference the identity cache associated with the identity system and authenticating a user to access the application comprises creating a token at the orchestrating agent, wherein the token is created based on one of: receiving the user authentication confirmation at the orchestrating agent and using the orchestrating agent to reference the identity cache associated with the identity system.

In some implementations of the system, the method, and the non-transient computer-readable storage medium described herein, a user session is created with the application in response to authenticating the user at the application.

In some implementations of the system, the method, and the non-transient computer-readable storage medium described herein, the identity data comprises at least one of a user identifier, a username, and a password, and the identity system creates a first identity session based at least in part on authenticating the user at the identity system.

In some implementations of the system, the method, and the non-transient computer-readable storage medium described herein, the orchestrating agent is provided with information pertaining to the first identity session prior to creating the token at the orchestrating agent. In some implementations of the system, the method, and the non-transient computer-readable storage medium described herein, a second identity session is created at the orchestrating agent prior to creating the token at the orchestrating agent, wherein the second identity session is created in response to the first identity session.

In some implementations of the system, the method, and the non-transient computer-readable storage medium described herein, transmitting the request for additional information comprises one or more of: requesting identity data from the user, the identity data including at least a username and password, requesting answers to one or more security questions, and requesting additional identity data from the user, wherein the additional identity data comprises at least one of a user identifier, a user first name, a user last name, a job title, a physical address, an email address, and information related to a social security number.

In some implementations of the system, the method, and the non-transient computer-readable storage medium described herein, the identity cache is at least one of electronically, logistically, and communicatively coupled to the identity system and an orchestrating agent. In some implementations of the system, the method, and the non-transient computer-readable storage medium described herein, a subset of at least one of identity metadata and identity data associated with a plurality of users, including at least the user, is stored to the identity cache.

In some implementations of the system, the method, and the non-transient computer-readable storage medium described herein, the subset of identity data comprises one or more of login information, one or more security questions, respective answers to each of the one or more security questions, and additional user data, the additional user data comprising at least one of a user identifier, a user first name, a user last name, a job title, a physical address, an email address, and information related to a social security number.

In some implementations of the system, the method, and the non-transient computer-readable storage medium described herein, the identity cache is periodically synced with the identity system via the orchestrating agent. In some implementations of the system, the method, and the non-transient computer-readable storage medium described herein the identity system is a cloud-based identity system.

In some implementations of the system, the method, and the non-transient computer-readable storage medium described herein, the orchestrating agent comprises (or utilizes) at least one of: a standard identity protocol, the standard identity protocol comprising at least one of OpenID Connect (OIDC), Security Assertion Markup Language (SAML), and WebAuthn; a multi-factor authentication (MFA); and a combination thereof.

Another aspect of the disclosure relates to a method for managing a plurality of cloud identity systems in an identity infrastructure, the method comprising installing an identity fabric in the identity infrastructure, wherein the identity fabric comprises one or more of a plurality of elements and a plurality of agents, each of the one or more of a plurality of elements and plurality of agents are in communication with at least some of the other of the plurality of elements and the plurality of agents, and the one or more of a plurality of elements and plurality of agents comprise at least one controller element, one or more orchestrating agents, and a plurality of fabric connectors for communicating with the one or more cloud identity systems, one or more configuration agents, and one or more monitoring agents. In some implementations, the method further comprises receiving, at the identity infrastructure, one or more data flows pertaining to at least one of identity data and identity metadata, wherein each of the one or more data flows are associated with at least one of the plurality of cloud identity systems, and are linked to at least one event. In some implementations, the identity data comprises: one or more of a user identity, a user credential, and a user attribute for one or more individual users of the one or more cloud identity systems; and the identity metadata comprises: one or more of a password rule, an authorization policy, and network locations for identity domain elements of the one or more cloud identity systems. In some implementations, the method further comprises: managing, by the controller element, control plane operations across the plurality of elements and plurality of agents; managing, by at least one of the one or more orchestrating agents, configuration agents, and monitoring agents, the one or more data flows through the identity fabric; or via the fabric connectors, detecting and monitoring, by at least one of the plurality of elements and plurality of agents of the identity fabric, the at least one event linked to each of the one or more data flows; and assessing one or more of the identity data, the identity metadata, an identity data state, and identity metadata state across the one or more cloud identity systems in the identity infrastructure based at least in part on the detecting and monitoring.

Another aspect of the disclosure relates to a system configured for managing a plurality of cloud identity systems in an identity infrastructure, the system comprising one or more hardware processors configured by machine-readable instructions to install an identity fabric in the identity infrastructure, wherein the identity fabric comprises one or more of a plurality of elements and a plurality of agents, each of the one or more of a plurality of elements and plurality of agents are in communication with at least some of the other of the plurality of elements and the plurality of agents, and the one or more of a plurality of elements and plurality of agents comprise at least one controller element, one or more orchestrating agents, and a plurality of fabric connectors for communications with the one or more cloud identity systems, one or more configuration agents, and one or more monitoring agents. In some implementations, the one or more hardware processors are further configured by machine-readable instructions to receive, at the identity infrastructure, one or more data flows pertaining to at least one of identity data and identity metadata, wherein each of the one or more data flows are: associated with at least one of the plurality of cloud identity systems and are linked to at least one event. In some implementations, the identity data comprises one or more of a user identity, a user credential, and a user attribute for one or more individual users of the one or more cloud identity systems, and the identity metadata comprises one or more of a password rule, an authorization policy, and network locations for identity domain elements of the one or more cloud identity systems. In some implementations, the one or more hardware processors are further configured by machine-readable instructions to: manage, by the controller element, control plane operations across the plurality of elements and plurality of agents; manage, by at least one of the one or more orchestrating agents, configuration agents, and monitoring agents, the one or more data flows through the identity fabric or via the fabric connectors; detect and monitor, by at least one of the plurality of elements and plurality of agents of the identity fabric, the at least one event linked to each of the one or more data flows; and assess one or more of the identity data, the identity metadata, identity data state, and identity metadata state across the one or more cloud identity systems in the identity infrastructure based at least in part on the detecting and monitoring.

Another aspect of the disclosure relates to non-transient computer-readable storage medium having instructions embodied thereon, the instructions being executable by one or more processors to perform a method for managing a plurality of cloud identity systems in an identity infrastructure, the method comprising installing an identity fabric in the identity infrastructure, wherein the identity fabric comprises one or more of a plurality of elements and a plurality of agents, each of the one or more of a plurality of elements and plurality of agents are in communication with at least some of the other of the plurality of elements and the plurality of agents, and the one or more of a plurality of elements and plurality of agents comprise at least one controller element, one or more orchestrating agents, and a plurality of fabric connectors for communications with the one or more cloud identity systems, one or more configuration agents, and one or more monitoring agents. In some implementations of the non-transient computer-readable storage medium, the method further comprises receiving, at the identity infrastructure, one or more data flows pertaining to at least one of identity data and identity metadata, wherein each of the one or more data flows are associated with at least one of the plurality of cloud identity systems and are linked to at least one event. In some implementations of the non-transient computer-readable storage medium, the identity data comprises one or more of a user identity, a user credential, and a user attribute for one or more individual users of the one or more cloud identity systems, and the identity metadata comprises one or more of a password rule, an authorization policy, and network locations for identity domain elements of the one or more cloud identity systems. In some implementations of the non-transient computer-readable storage medium, the method further comprises: managing, by the controller element, control plane operations across the plurality of elements and plurality of agents; managing, by at least one of the one or more orchestrating agents, configuration agents, and monitoring agents, the one or more data flows through the identity fabric or via the fabric connectors: detecting and monitoring, by at least one of the plurality of elements and plurality of agents of the identity fabric, the at least one event linked to each of the one or more data flows; and assessing one or more of the identity data, the identity metadata, an identity data state, and an identity metadata state across the one or more cloud identity systems in the identity infrastructure based at least in part on the detecting and monitoring.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

FIG. 1 illustrates a system configured for management of identity management systems in an identity infrastructure, in accordance with one or more implementations.

FIG. 8 is a list of agents or elements configured for management of identity systems in an identity infrastructure, in accordance with one or more implementations.

FIG. 8 illustrates a process flow for controlling user access to an application when an identity provider is unavailable or offline, according to various aspects of the disclosure.

DETAILED DESCRIPTION

Figure 3A:
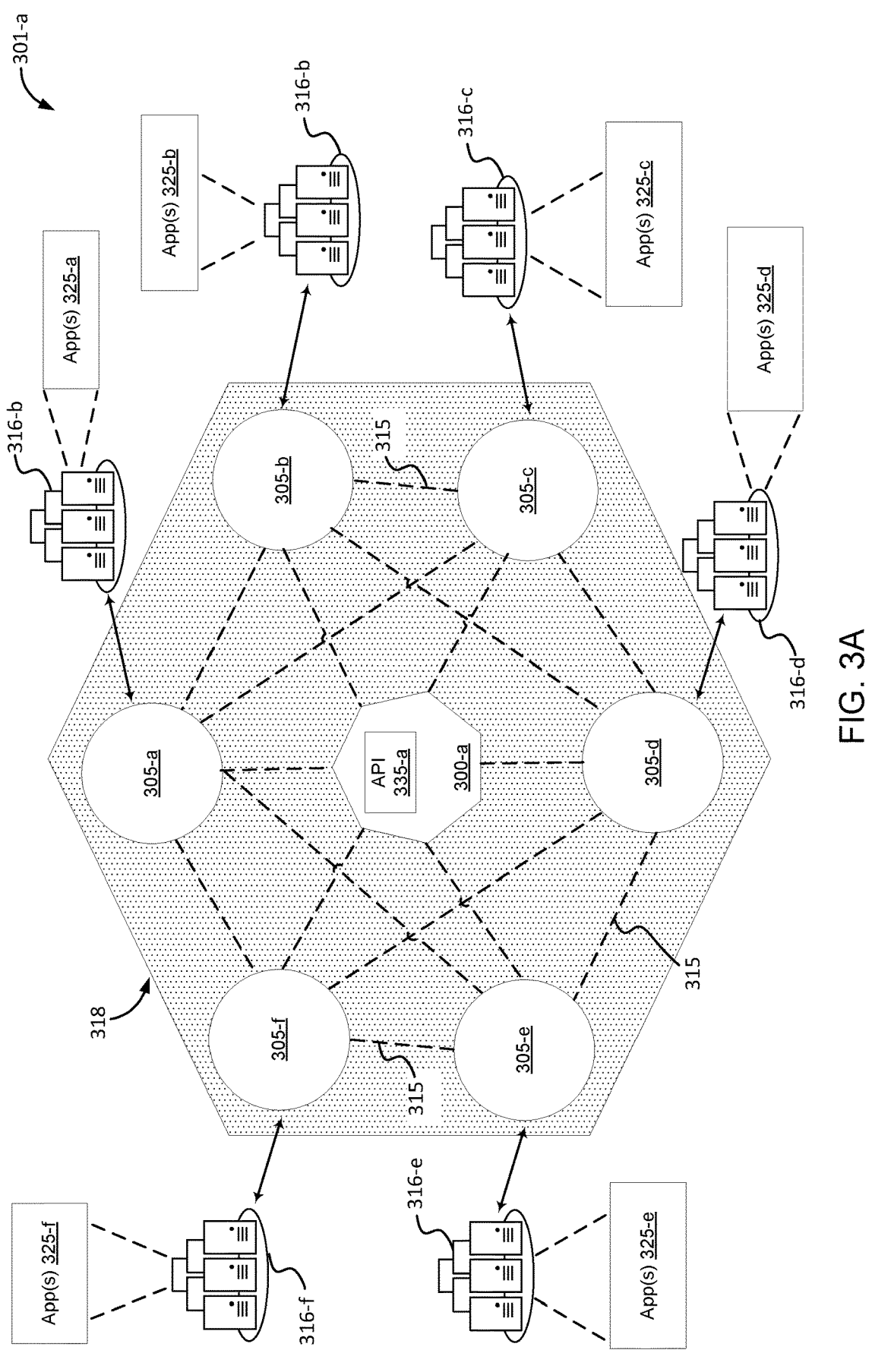
FIG. 3A illustrates a distributed identity management environment comprising the system of FIG. 1, according to an embodiment of the disclosure.

FIG. 1 illustrates a system 100 for operating identity management systems in an identity infrastructure. Seen in FIG. 3A is a system 300-*a* in a distributed identity management environment, where the system 300-*a* is communicatively coupled to various identity management systems 316 via one or more fabric connectors 305. Returning now to FIG. 1, in some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some examples, the client computing platforms 104 may comprise the identity management systems 316. Alternatively, the client computing platform 104 may be communicatively coupled to the identity management systems 316.

Server(s) 102 may be configured by machine-readable instructions 106. Machine-readable instructions 106 may include one or more instruction modules. The instruction modules may include computer program modules. The instruction modules may further include one or more of an agent element installment module 108, identity infrastructure assessment module 110, identity fabric elements installment module 112, data receiving module 114, control plane operation managing module 116, configuration agent managing module 118, element agent detection module 120, identity data assessment module 122, message authentication module 124, message checking module 126, message authorizing module 128, identity data moving module 130, identity cache module 191, and/or other instruction modules. It is contemplated that the identity fabric elements installment module 112 may also be referred to herein as an identity fabric installment module 112. Further, the element agent detection module 120 may also be referred to as an event detection module 120.

Element agent detection module 120 (or event detection module 120) may be configured to detect and monitor, by the one or more elements or agents of the identity fabric 318, as seen in FIG. 3A, at least one event linked to the one or more data flows in the identity fabric 318. The element agent detection module 120 may work in conjunction with one or more elements within the identity fabric 318 and communicatively coupled to the identity fabric 318, including, but not limited to, orchestrating agents, fabric connectors utilizing a common application programming interface (API) for communications with the one or more identity domains (i.e., the identity management systems 316 in FIG. 3A), controller elements, configuration agents, monitoring agents, and discovery agents, further described in relation to FIGS. 3A and 3B, to detect and monitor events linked to data flows through the identity fabric or via the fabric connectors. For instance, individual elements or agents of the identity fabric may detect and monitor data flows passing through them, and relay information pertaining to events linked to the data flows to the element agent detection module 120. In this way, the element agent detection module 120 may be able to monitor events linked to data flows pertaining to identity data or identity metadata received at the identity infrastructure. In some examples, system 100 may comprise more than one element agent detection or event detection module 120.

Agent element installment module 108 may be configured to install at least one discovery agent element in the identity infrastructure. The identity infrastructure may include one or more identity domains. The at least one discovery agent element may be installed on or adjacent to an identity infrastructure element in the identity infrastructure.

Identity infrastructure assessment module 110 may be configured to assess, by the at least one discovery agent element, the identity infrastructure. The assessing may include one or more of detecting and reporting identity data and identity metadata from the identity infrastructure and identifying one or more elements or agents for installing. Communication between the one or more elements or agents may be secured via transport layer security. By way of non-limiting example, the identity data may include one or more of a user identity, a user credential, and a user attribute for one or more individual users of the one or more identity domains. By way of non-limiting example, the identity metadata may include one or more of a password rule, an authorization policy, an authentication policy, a trust policy, and network locations for identity domain elements of the one or more identity domains.

Identity fabric installment module 112 may be configured to install various identity fabric elements to create the identity fabric 318, as seen in FIG. 3A, in the identity infrastructure based at least in part on the assessing. By way of non-limiting example, managing the one or more data flows through the identity fabric may include managing the one or more data flows pertaining to identity data, the identity data including one or more of an authentication request, an authorization request, and an update of user attributes or credentials. Managing control plane operations may further include spawning one or more new elements or agents or decommissioning one or more existing elements or agents in the identity fabric. The identity fabric may include the one or more elements or agents in communication with each other. In some embodiments, the communication may further include requesting, by an element or agent, at least one action from another element or agent. Examples of such actions include but are not limited to performing a local file change to effect a configuration update in the local Identity Domain (outside of the purview of the requesting element), updating the requestee's software version or configuration, having the requestee delete itself, and/or performing local searches for specific information outside of the requester's purview.

By way of non-limiting example, the elements or agents may be selected from a group consisting of orchestrating agents, fabric connectors utilizing a common API for communications with the one or more identity domains, controller elements, configuration agents, and monitoring agents. For example, fabric connectors may utilize a master API configured to communicate with different APIs for different identity domains. Specifically, communication to the connectors, agents and administrators may utilize a common API to receive tasks. One such task may comprise a "CreateUser" task for setting up a user in the system and/or a specific Identity Domain. In such a scenario, the connectors may translate between the master API (i.e., a common language API) to the specific APIs for the Identity Domain (s). In some circumstances, each identity domain may have its own API, either explicitly or implicitly, which may or may not be published for general public use. In some examples, at least one element or agent may be configurable into another type of element or agent, or as more than one type of element or agent.

Data receiving module 114 may be configured to receive, at the identity infrastructure, one or more data flows pertaining to identity data or identity metadata for at least one identity domain. The one or more data flows may be linked to at least one event. The communication may further include reporting, by at least one element or agent, the at least one event to the one or more other elements or agents.

Figure 3B:
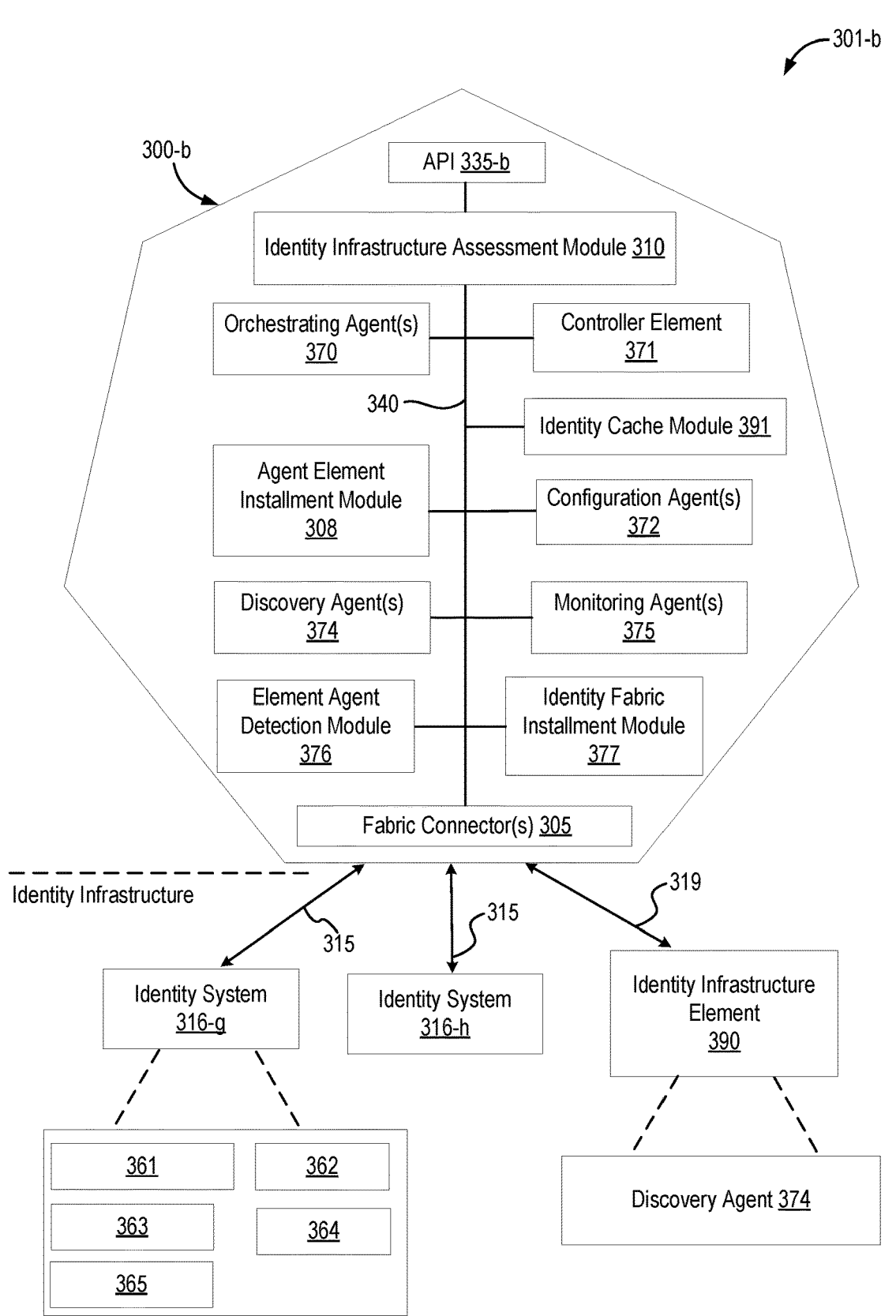
FIG. 3B illustrates a detailed view of the system in FIG. 3A, according to an embodiment of the disclosure.
Figure 6:
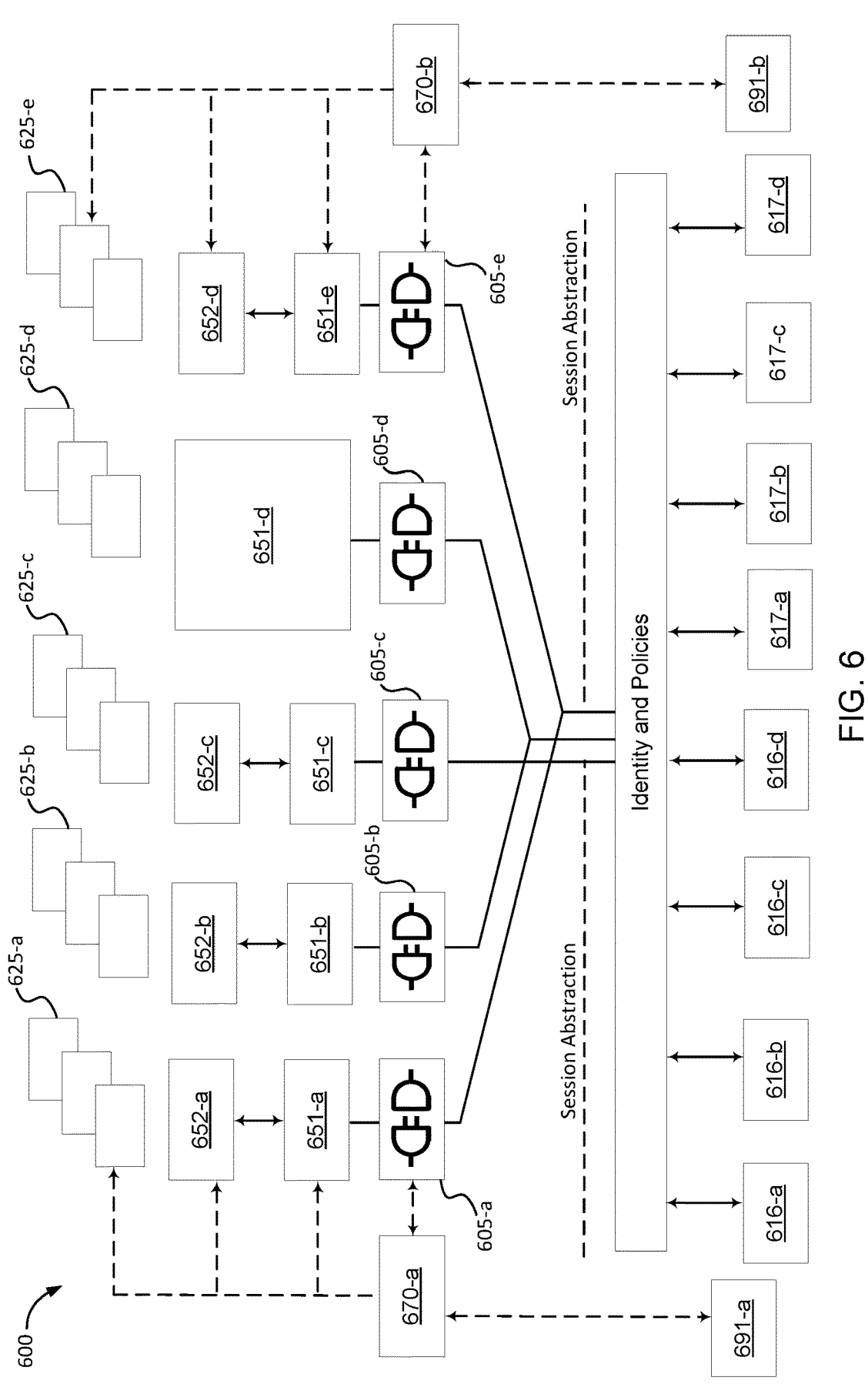
FIG. 6 illustrates an example of an identity control plane for managing control plane operations, according to an embodiment of the disclosure.

Control plane operation managing module 116 may be configured to manage, by the controller element, control plane operations across the one or more elements or agents, further described in relation to FIGS. 3B and 6.

Configuration agent managing module 118 may be configured to manage, by at least one of the orchestrating agent, the configuration agent and the monitoring agent, the one or more data flows through the identity fabric or via the fabric connectors.

Identity data assessment module 122 may be configured to assess the identity data or metadata and an identity data or metadata state across the one or more identity domains in the identity infrastructure based at least in part on the detecting and monitoring.

Message authentication module 124 may be configured to authenticate incoming messages from a message originator. One such authentication may comprise key/certification matching. Other authentication mechanisms may include but are not limited to standards-based authentication mechanisms such as OpenID Connect, OAuth, SAML, and password-based mechanisms. In some cases, the message originator may be a user or an administrator. By way of non-limiting example, managing the one or more data flows via the fabric connector may include one or more of detecting and applying changes in an overall state of the identity infrastructure and acting upon an identity domain of the one or more identity domains on behalf of a user or an administrator based at least in part on an authentication performed by the user, a request for permission to access a protected resource by the user, an update to user attributes or credentials by the user, or setting of access policy rules by an administrator.

Message checking module 126 may be configured to check the incoming messages for authorization based at least in part on evaluating message contents of the incoming messages with respect to permissions granted to the message originator.

Message authorizing module 128 may be configured to authorize or flag the incoming messages based at least in part on the checking.

Identity data moving module 130 may be configured to move identity data and associated identity data requests for the one or more identity domains between different geographic regions based at least in part on one or more identity regulatory constraints.

The identity cache module 191 may be similar or substantially similar to the identity cache module(s) 391, 691-a, 691-b, 891, and/or 991 described below in relation to FIGS. 3B, 6, 8, and/or 9 respectively. In some embodiments, the identity cache module 191 is configured to work in conjunction with the orchestrating agent to help verify the additional information (e.g., identity data) received from the user, for instance, when there is an outage at an identity system. In some embodiments, the orchestrating agent references the identity cache associated with the unavailable/offline identity system to verify the additional information/identity data received from the user.

In some examples, the identity cache module 191 is configured to store a subset of at least one of identity metadata and identity data associated with a plurality of users, including at least the user attempting to access the application. In some cases, the identity cache module 191 is at least one of electronically, logistically, and communicatively coupled to the identity system and an orchestrating agent. In some examples, the subset of identity data comprises one or more of login information, one or more security questions, respective answers to each of the one or more security questions, and additional user data, wherein the additional user data comprises at least one of a user identifier, a user first name, a user last name, a job title, a physical address, an email address, and information related to a social security number or any other user data disclosed here and/or known in the art.

In some examples, the identity cache module 191 is configured to periodically sync with the identity system via the orchestrating agent to update the additional user data stored in the module 191, wherein the identity system is a cloud-based identity system.

In some examples, the identity data comprises at least one of a user identifier, a username, and a password, and wherein the identity system creates a first identity session based at least in part on authenticating the user at the identity system.

In some cases, managing the one or more data flows through the identity fabric may include directing requests to one or more other elements or agents of the identity fabric or to an appropriate identity domain of the one or more identity domains.

In some implementations, by way of non-limiting example, the one or more data flows pertaining to identity metadata may include one or more of setting access policies, password rules, and data locations of identity data and metadata. In some implementations, managing control plane operations may further include updating software versions or certificate versions in the identity infrastructure. In some implementations, managing control plane operations may further include indicating, by the controller element, an indication of a new traffic flow to one or more elements or agents based at least in part on identifying a new identity workflow.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute modules 108, 110, 112, 114, 116, 118, 120, 122, 124, 126, 128, 130, and/or 191, and/or other modules. Processor(s) 136 may be configured to execute modules 108, 110, 112, 114, 116, 118, 120, 122, 124, 126, 128, 130, and/or 191, and/or other modules by software; hardware; firmware; some combination of software, hardware, and/or firmware; and/or other mechanisms for configuring processing capabilities on processor(s) 136. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, and/or 191 are illustrated in FIG. 1 as being implemented within a single processing unit, in implementations in which processor(s) 136 includes multiple processing units, one or more of modules 108, 110, 112, 114, 116, 118, 120, 122, 124, 126, 128, 130, and/or 191 may be implemented remotely from the other modules. The description of the functionality provided by the different modules 108, 110, 112, 114, 116, 118, 120, 122, 124, 126, 128, 130, and/or 191 described below is for illustrative purposes, and is not intended to be limiting, as any of modules 108, 110, 112, 114, 116, 118, 120, 122, 124, 126, 128, 130, and/or 191 may provide more or less functionality than is described. For example, one or more of modules 108, 110, 112, 114, 116, 118, 120, 122, 124, 126, 128, 130, and/or 191 may be eliminated, and some or all of its functionality may be provided by other ones of modules 108, 110, 112, 114, 116, 118, 120, 122, 124, 126, 128, 130, and/or 191. As another example, processor(s) 136 may be configured to execute one or more additional modules that may perform some or all of the functionality attributed below to one of modules 108, 110, 112, 114, 116, 118, 120, 122, 124, 126, 128, 130, and/or 191.

Figure 2:
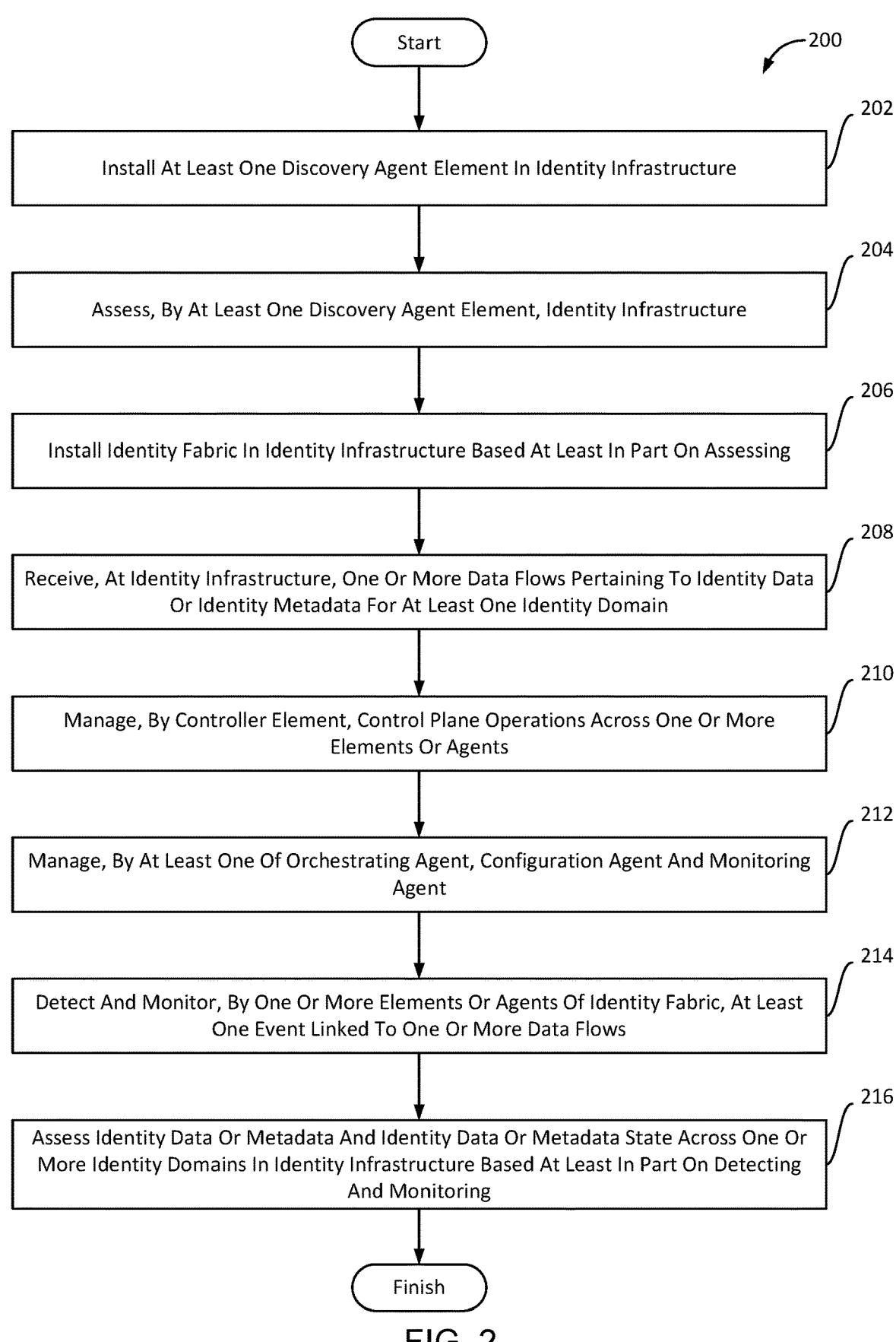
FIG. 2 illustrates a method for management of identity management systems in an identity infrastructure, in accordance with one or more implementations.

FIG. 2 illustrates a method 200 for management of identity management systems in an identity infrastructure, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

A first operation 202 may include installing at least one discovery agent element (e.g., shown as discovery agent 374 in FIG. 3B) in the identity infrastructure. The identity infrastructure may include one or more identity domains. In some cases, an identity domain may also be referred to as an identity access management system or an identity system 316. The at least one discovery agent element may be installed on or adjacent to a critical identity infrastructure element (e.g., an Apache server, or an identity provider such as an LDAP or SQL database, or at network ingress) in the identity infrastructure. First operation 202 may be performed by one or more hardware processors configured by machine-readable instructions including a module that is the same as or similar to agent element installment module 108, in accordance with one or more implementations.

A second operation 204 may include assessing, by the at least one discovery agent element, the identity infrastructure. The assessing may include one or more of detecting and reporting identity data and identity metadata from the identity infrastructure and identifying one or more elements or agents for installing. The identity data may include one or more of a user identity, a user credential, and a user attribute for one or more individual users of the one or more identity domains. The identity metadata may include one or more of a password rule, an authorization policy, an authentication policy, a trust policy, and network locations for identity domain elements of the one or more identity domains. Second operation 204 may be performed by one or more hardware processors configured by machine-readable instructions including a module that is the same as or similar to identity infrastructure assessment module 110, in accordance with one or more implementations.

Third operation 206 may include installing an identity fabric in the identity infrastructure based at least in part on the assessing. The identity fabric may include the one or more elements or agents in communication with each other. The elements or agents may be selected from a group consisting of orchestrating agents, fabric connectors utilizing a common application programming interface for communications with the one or more identity domains, controller elements, configuration agents, and monitoring agents. At least one element or agent may be configurable into another type of element or agent, or as more than one type of element or agent. Third operation 206 may be performed by one or more hardware processors configured by machine-readable instructions including a module that is the same as or similar to identity fabric installment module 112, in accordance with one or more implementations.

Fourth operation 208 may include receiving, at the identity infrastructure, one or more data flows pertaining to identity data or identity metadata for at least one identity domain. The one or more data flows may be linked to at least one event, such as a user login, or a user requesting access to a protected resource (e.g., an app, a document, etc.).

Fourth operation 208 may be performed by one or more hardware processors configured by machine-readable instructions including a module that is the same as or similar to data receiving module 114, in accordance with one or more implementations.

Fifth operation 210 may include managing, by the controller element, control plane operations across the one or more elements or agents, further described in relation to FIG. 6. Fifth operation 210 may be performed by one or more hardware processors configured by machine-readable instructions including a module that is the same as or similar to control plane operation managing module 116, in accordance with one or more implementations.

Sixth operation 212 may include managing, by at least one of the orchestrating agent, the configuration agent and the monitoring agent, the one or more data flows. The one or more data flows may flow through the identity fabric or via the fabric connectors. Sixth operation 212 may be performed by one or more hardware processors configured by machine-readable instructions including a module that is the same as or similar to configuration agent managing module 118, in accordance with one or more implementations.

Seventh operation 214 may include detecting and monitoring, by the one or more elements or agents of the identity fabric, the at least one event linked to the one or more data flows. Seventh operation 214 may be performed by one or more hardware processors configured by machine-readable instructions including a module that is the same as or similar to element agent detection module 120, in accordance with one or more implementations.

Eighth operation 216 may include assessing the identity data or metadata and an identity data or metadata state across the one or more identity domains in the identity infrastructure based at least in part on the detecting and monitoring. Eighth operation 216 may be performed by one or more hardware processors configured by machine-readable instructions including a module that is the same as or similar to identity data assessment module 122, in accordance with one or more implementations.

FIG. 3A illustrates a distributed identity management environment 301 according to an embodiment of the disclosure. In some cases, the distributed identity management environment may comprise identity infrastructure for one or more disparate identity systems 316 in use by a client organization or enterprise. In some cases, at least a portion of the disparate identity systems 316 may be associated with one or more cloud computing platforms. For instance, the client organization may utilize the cloud computing platforms for running applications ("apps") used by the client organization's workforce (e.g., a CRM app, such as SALES-FORCE, an accounting app, project management app, an app or software used by their HR department, to name a few non-limiting examples) and/or the client organization's customers (e.g., a customer self-service portal used by customers of a wireless provider or internet-cable company). In some cases, the system of the present disclosure facilitates a distributed identity management environment through the use of the identity fabric 318. In some aspects, the identity fabric 318 may refer to a distributed identity model, which may allow a client or user to consistently manage identity and policies across multiple clouds or disparate identity systems 316. In some cases, the distributed identity management environment 301 may comprise a system 300-*a* configured for administration of one or more identity systems 316. System 300-*a* may be similar or substantially similar to the system 100 described in relation to FIG. 1. In some embodiments, the system 300-*a* may comprise a server (not shown). Alternatively, the system 300-*a* may be implemented using a server (e.g., the system 300-*a* may be hosted on a server), where the server may be utilized to manage the identity infrastructure. In some other cases, the server or system 300-*a* may be configured to manage multiple distributed identity management environments, each distributed identity management environment associated with at least one enterprise or organization and comprising one or more identity systems. For instance, the server (or system 300-*a*) may be located in the cloud (i.e., not exclusive to a single client) and may be configured to simultaneously communicate with identity systems across multiple distributed identity management environments via the cloud. Alternatively, the identity infrastructure and/or disparate identity systems (e.g., cloud-based identity systems, on-premises identity systems) for each client organization or enterprise may be managed via an existing identity infrastructure element (e.g., identity infrastructure element 390 in FIG. 3B, which may be an example of an on-premises Apache or Nginx server).

In some cases, the system 301-*a* may comprise a common Application Programming Interface (335) for communications with the one or more identity domains or identity systems 316. In some embodiments, applications or apps may be distributed across multiple cloud platforms. For instance, a company or organization may comprise first apps 325-*a* deployed on a first cloud platform 316-*a*, second apps 325-*b* deployed on a second cloud platform 316-*b*, third apps 325-*c* deployed on a third cloud platform 316-*c*, fourth apps 325-*d* deployed on a fourth cloud platform 316-*d*, fifth apps 325-*e* deployed on a fifth cloud platform 316-*e*, and sixth apps 325-*f* deployed on a sixth cloud platform 316-*f*. In some cases, each cloud platform 316 may be associated with a unique identity infrastructure system and management system. Additionally, since each cloud platform 316 may comprise varying identity capabilities, consistent management of user access policies may pose some challenges. The system 300-*a* may be configured to work as an abstraction layer (e.g., by integrating with one or more cloud platforms and/or identity systems, which allows apps to be decoupled from identity), an identity control plane (e.g., by managing consistent user identity and access policies for apps deployed across multiple cloud platforms), or a combination thereof, allowing organizations or enterprises to run apps 325 on various cloud and identity systems (i.e., identity systems 316). In some examples, fabric connectors 305 may provide for integration with different cloud platforms and/or identity systems. Some non-limiting examples of identity systems that may be supported by the fabric connectors include AZURE ACTIVE DIRECTORY (AD) provided by Microsoft Inc., of Redmond, WA, OKTA provided by Okta, Inc., of San Francisco, CA, SYMANTEC SITEMINDER provided by Broadcom, Inc., of San Jose, CA, ORACLE ACCESS MANAGER (OAM) provided by Oracle Corporation of Austin, TX, PING provided by Ping Identity Corporation of Denver, CO, SALESFORCE provided by Salesforce, Inc., of San Francisco, CA, PLAINID provided by PlainID Inc., of Tel Aviv, Israel, and FORGEROCK provided by ForgeRock of San Francisco, CA. Each identity system 316 (or cloud platform 316) may utilize, or may be, an identity provider. As used herein, the term "identity provider" refers to an entity that stores and manages user's digital identities. Identity providers (or IdPs) may check user identities via username-password combinations and other authentication factors (e.g., something the user possesses, such as a smartphone; an intrinsic quality of the user, such as a fingerprint or retina scan). Thus, an IdP may utilize one or more factors to identify/authenticate a user. Using multiple factors to verify user identity is also referred to as multi-factor authentication or MFA.

As shown, the identity fabric 318 may comprise one or more fabric connectors 305 (e.g., fabric connectors 305-*a*, 305-*b*, 305-*c*, 305-*d*, 305-*e*, 305-*f*). These fabric connectors 305 may allow one or more agents or elements of the system 300-*a* to manage the policies of the built-in identity systems, further described in relation to FIG. 3B. As shown, the one or more fabric connectors 305 may be in communication with at least some of the other fabric connectors 305 (shown by the dashed lines). Each of the dashed lines may represent a data flow 315. As used herein, the term "data flow" may refer to a path for data to move from different parts of the distributed identity management environment. For instance, data flow may refer to a path for data to move between different identity systems 316, between different fabric connectors 305 of the identity fabric 315, between a fabric connector 305 and the system 300-*a*, and/or between different elements/agents within the identity fabric (e.g., between an orchestrating agent and a fabric connector, between a discovery agent and a configuration agent, etc.), to name a few non-limiting examples. In some examples, a data flow may represent a single data element (e.g., username, date of birth, Social Security Number (SSN), etc.). Alternatively, a data flow may represent a set of data elements (i.e., a data structure). In some other cases, a data flow may be used to organize and persist self-service data (i.e., data may be transformed as part of the data flow). In some aspects, data flows may help reusability of the underlying data elements, for instance, between different identity domains or identity systems.

In some cases, the one or more data flows 315 may pertain to identity data or identity meta data for at least one identity domain (or identity system 316). While not shown, an orchestrating agent within the identity fabric 318 may be configured to direct flow of identity data (i.e., identity data flow 315) through the identity fabric 318, directing requests to other elements in the identity fabric 318 or to appropriate identity systems 316. In this way, the system 300-*a* may support identity orchestration and automation. For instance, the system 300-*a* may facilitate in automating identity workloads including authentication, access control, migration, and last-mile integration across different identity systems. In some cases, the identity systems 316 may be on-premises, in the cloud, or a combination. In some examples, the system 300-*a* deploys multiple agents/elements of the same type (e.g., orchestrating agents, monitoring agents, etc.) in the identity fabric 318. For example, the system 300-*a* may spawn multiple orchestrating agents, where the orchestrating agents may be distributed among the disparate identity systems 316 (e.g., disparate Identity as a Service or IaaS clouds). In one non-limiting example, there may be a 1-to-1 correspondence between the number of orchestrating agents spawned by the system 300-*a* and the number of identity systems 316. While generally described as cloud identity systems 316, this is not intended to be limiting. In some cases, at least one of the identity systems 316 may be a locally hosted identity system, e.g., managed and controlled by the organization. An identity system 316 that is hosted locally and within the control of an organization/enterprise may be referred to as an on-premises identity system. The system 300-*a* may also spawn or install an orchestrating agent (or another agent, such as a monitoring or configuration agent) at the on-premises identity system. The multiple agents or elements deployed by the system 300-*a* may coordinate and orchestrate identity data and dataflows 315 through the identity fabric 318. Additionally, the controller element (shown as controller element 371 in FIG. 3B) helps coordinate the operations and configurations of the distributed agents/elements across the disparate identity systems.

In some embodiments, the fabric connectors 305 may implement a specified set of behaviors to be utilized within the identity environment 301-*a*. Further, the fabric connectors 305 may be written in any computing language so long as the language is accepted by the defined API 335-*a* and it is contemplated that the fabric connectors 305 can be 'low code' in that the connectors act as a facade layer between an element (such as an orchestrator) in the identity fabric and an individual identity domain or cloud platform. In some examples, fabric connectors 305 may use the same API across disparate identity domains or identity systems 316, which may allow the system 300-*a* to interact with one or more of the identity systems 316 equivalently with specialized code and behavior targeted to the particular identity system's needs contained within the fabric connectors 305, for instance. Such specialized code and behavior is related to system's 316 individualized authentication and authorization policies. As noted above, the distributed identity environment 301-*a* may comprise a plurality of agents/elements, such as orchestrating agents, dispersed through the identity fabric. In some cases, there may be one orchestrator and fabric connector associated with each identity system 316. Further, each orchestrator (or orchestrating agent) system may facilitate in identity orchestration and automation for a respective identity system 316. As described below in relation to FIGS. 8 and 9, orchestrators may also facilitate in identity-centric operations, such as authentication and/or controlling access to an application, to name two non-limiting examples, when there is an outage at a respective identity system (i.e., the identity system 316-*b* associated with an application 325-*b* the user is trying to access is unavailable or offline). In some examples, the orchestrator helps validate the user identity by referencing a cache stored at an identity cache module (e.g., shown as identity cache modules 891, 991 in FIGS. 8, 9).

FIG. 3B illustrates a detailed view of a system 300-*b* operating in a distributed identity management environment 301-*b*, according to an embodiment of the disclosure. In some cases, the system 300-*b* may be similar or substantially similar to the system 300-*a* in FIG. 3A. Further, the distributed identity management environment 301-*b* may be similar or substantially similar to the distributed identity management environment 301-*a* described in relation to FIG. 3A. In some cases, the system 300-*b* may comprise one or more of: an API 335-*b*, an identity infrastructure assessment module 310, one or more orchestrating agent(s) 370, at least one controller element 371, an agent element installment module 308, one or more configuration agent(s) 372, one or more discovery agent(s) 374, one or more monitoring agent(s) 375, an element agent detection module 376, and an identity fabric installment module 377. In some embodiments, the one or more fabric connector(s) 305 may utilize the common application programming interface (API) 335-*b* for communications with the disparate identity systems 316, orchestrating agents 370, controller elements 371, configuration agents 372, monitoring agents 375, etc. The system 300-*b* may spawn or install a plurality of orchestrating agents 370, configuration agents 372, and/or monitoring agents 375, and disperse them throughout the identity fabric comprising the disparate identity systems 316. In some non-limiting examples, each identity system 316 may be associated with a fabric connector 305 and one or more of an orchestrating agent 370, a configuration agent 372, and a monitoring agent 375. In other cases, a different or the same orchestrating agent 370 is assigned to each or more than one identity system 316. In some examples, the various elements or agents distributed among the disparate identity systems 316 (e.g., IaaS cloud platforms, locally hosted identity systems, etc.) may coordinate and orchestrate identity dataflows 315 in the distributed identity management environment 301-*b*, for instance, directly or via the fabric connectors 305. In some cases, the at least one controller element 371 helps configure the different agents/elements (e.g., before they are installed in the identity fabric by the agent element installment module 308) and/or coordinates their operations (e.g., after installation in the identity fabric). In some embodiments, additional modules or elements not shown in FIG. 3B may be installed in the system 300-*b*. For instance, while not shown, the system 300-*b* may comprise an identity fabric elements installment module, a data receiving module, a control plane operation managing module, etc., previously described in relation to FIG. 1 and elsewhere. In some cases, the various elements, agents, and/or modules of the system 300-*b* may be embodied in hardware, software, or a combination thereof. Further, the one or more agents and elements may be in communication via a bus 340. Additionally, or alternatively, the agents and elements may communicate via the identity dataflows 315, for instance, if they are distributed among the disparate identity systems 316.

In some cases, centralized configuration and management of disparate identity management systems (e.g., identity systems 316-*g*, 316-*h*, etc.) may begin by the introduction of workers and/or proxies into the identity infrastructure. These workers and/or proxies may be configured to assist in the meta-management of the identity information associated with these systems. In some cases, one or more discovery agents 374 may be installed within the identity infrastructure (e.g., the infrastructure associated with the distributed identity management environment 301-*b*). In some examples, the discovery agents 374 may be configured to report information about the identity infrastructure to the agent element installment module 308 or any of the other modules described in relation to FIG. 1, such as the identity infrastructure assessment module 110, identity fabric installment module 112, etc. Such information may comprise where the various identity systems 316 are located in the network (e.g., IP addresses, etc.), how the identity systems 316 communicate with each other and/or other devices in the architecture, what types of authentication and authorization the identity systems 316 require, and what metadata the identity systems use, such as authentication or authorization policies, password policy, etc.). Additionally, or alternatively, the discovery agents 374 may be configured to report information about which identity fabric elements (e.g., orchestrating agent(s) 370, monitoring agent(s) 375, configuration agent(s) 372, etc.) need to be installed and at what locations the controller element 371 (also referred to as a controller agent) may be installed to manage each of the other elements installed. It is contemplated that the one or more of the identity fabric elements and the agents described may herein be referred to as the identity fabric (shown as identity fabric 318 in FIG. 3A). Alternatively, in lieu of the controller element 371, each element may be configured and managed directly via configuration files or API. It should be noted that, while FIG. 3B depicts the various agents and elements as being within the system 300-*b*, one or more of the various agents and elements (e.g., discovery agents 374) may be dispersed into the identity infrastructure by the system 300-*b*, and as shown in FIG. 8 (Identity Infrastructure Reference Architecture Fig. 8), to gather information about the architecture of the identity infrastructure and communications (e.g., data flows 315) between various users of the identity infrastructure and different apps or subsystems being accessed by said users, to name a few non-limiting examples. As shown, the identity infrastructure may comprise one or more disparate identity systems (e.g., identity system 316-*g*, 316-*h*, 316-*i*). In some cases, each identity system may be associated with one or more configurations 361, groups 362, roles 363, features 364, and/or identities 365 related to the system's policies. Further, the one or more disparate identity systems (or alternatively, the one or more orchestrating agents) may enforce one or more policies before users are allowed to gain access to applications through the corresponding identity system. In some aspects, the identity system (or an orchestrating agent) may also serve as a gateway to the applications.

In some examples, the controller element 371 installs an orchestrator (or orchestrating agent 370) at each identity system of the plurality of identity systems 316. The orchestrating agent(s) 370 may help provide some degree of resiliency to the application (or app) access control process, for instance, if the corresponding identity system is unavailable, further described in relation to FIGS. 8 and/or 9. To account for the possibility of connectivity issues (e.g., an identity system 316 associated with an application 325 is offline) in the distributed identity management environment 301-*b*, orchestrating agent(s) may help cache relevant identity information (e.g., identity data, identity metadata, questions and answers to challenge/security questions, to name a few non-limiting examples) and reference said identity information, for instance, to authenticate and authorize a user. In some cases, the user may have been previously authenticated and authorized by the identity system, i.e., before it went offline, and may be trying to reconnect during a "disconnected mode". In such cases, a session (shown as session 434 in FIG. 4) may have been previously initiated for the user and cached (i.e., information pertaining to the session may be cached and stored in the identity cache module). In some examples, the identity cache module may utilize an independent mechanism for verifying the user during subsequent requests to access the application. For example, once an initial user session is established with the identity system (or identity provider), herein referred to as a "connected mode", the identity cache module may prompt the user to register a password and/or register a second factor for authentication (e.g., register biometric information, such as a fingerprint; register another device associated with the user, for instance, to receive a onetime password or code). This allows the identity cache module to authenticate the user, for instance, during a "disconnected mode". In other cases, the user may be trying to access the app for the first time (i.e., no previous session). In either case, the orchestrating agent 370 may assist in authenticating and authorizing the user, based on one or more of the identity data, identity metadata, and/or information related to the previous session (if any) stored at the identity cache module. For example, when a request to access an application is received, an orchestrating agent 370 may determine if the identity system (or identity provider) associated with the application is 'available' or 'unavailable'. If unavailable, the orchestrating agent 370 helps authenticate the user and verify that the user is authorized to access the app despite the connectivity issue with the identity system, described in further detail below.

In some cases, an agent element installment module 372 may be configured to install 319 at least one discovery agent element (e.g., discovery agent 374) in the identity infrastructure. The identity infrastructure may include the one or more identity domains or identity systems, and the at least one discovery agent 374 may be installed on or adjacent to an identity infrastructure element 390 in the identity infrastructure. In some examples, the identity infrastructure element 390 may be an Apache Server, an IIS Server, or any other piece of identity infrastructure located in the cloud and adapted to communicate and otherwise exchange data with other devices in the identity architecture 301-*a* via any identity protocol, for example OpenID Connect (OIDC), Security Assertion Markup Language (SAML), New Technology LAN Manager (NTLM); or via any other software communication protocol such as Hypertext Transfer Protocol (HTTP), Transmission Control Protocol (TCP), etc.

Next, the identity infrastructure assessment module 310 may be configured to assess, by the at least one discovery agent 374, the identity infrastructure. The assessing may include one or more of detecting and reporting to the identity infrastructure element 390 identity data and identity metadata from the identity infrastructure and identifying one or more identity fabric elements or agents for installing within the infrastructure. For instance, the assessing may include detecting and reporting identity data (e.g., information pertaining to identities 365, roles 363, groups 362, etc.) and identity metadata (e.g., information pertaining to configurations 361, features 364, policies, such as an authorization policy, network locations for identity domain elements of the one or more identity systems 316, etc.) from identity systems 316-*g* and/or 316-*h* in the identity infrastructure. In some examples, an orchestrating agent installed at or near (e.g., in communication with) an identity system may also store a subset of one or more of the identity data and the identity metadata to an identity cache module 391 (also shown as identity cache module 891 in FIG. 8). There may be one identity cache module 391 for each identity system 316. Alternatively, the identity cache module 391 may be hosted locally (e.g., on-premises) and within the control of the organization and may be used to cache identity data for the disparate identity systems 316. Further, the identity cache module 391 may be electronically, logistically, and/or communicatively coupled to the one or more orchestrating agents 370 and/or identity systems 316 in the identity fabric. For instance, the orchestrating agent associated with an identity system 316 may periodically sync the identity information (e.g., identity data, identity metadata) at the identity system with the information stored in the identity cache module 391. Alternatively, the orchestrating agent 370 instructs the identity cache module 391 to update its information based on detecting a change in the identity information (e.g., password update by a user, change in user role, a user has left the organization resulting in their account being inactivated, etc.) stored at the identity system. Communication between the one or more elements or agents may be secured via a transport layer security (e.g., communications over bus 340, data flows 315, etc.). By way of a non-limiting example, the identity data may include one or more of a user identity, a user credential, and a user attribute for one or more individual users of the one or more identity domains. By way of non-limiting example, the identity metadata may include one or more of a password rule, an authorization policy, an authentication policy, a trust policy, and network locations for identity domain elements of the one or more identity domains.

In some embodiments, the discovery agents 374 may be used to assess and document the established identity infrastructure. In some examples, this can be done before any other identity fabric elements are in place within the identity management environment 301-*b* and may be considered to be a precursor to installation of the full identity fabric (e.g., shown as identity fabric 318 in FIG. 3A). The discovery agents 374 may be installed on or adjacent to identity infrastructure elements, e.g., on an Apache or Nginx server, or on the control elements of an established identity domain or identity system 316, such as an Oracle Access Manager (OAM) Server. The discovery agent 374 may be configured to detect and report identity data and identity metadata from the established identity infrastructure. Some non-limiting examples include user identities and attributes, configuration of the identity infrastructure and its flows, and authorization policies and rules. Such attributes may comprise name, address, and group associations.

Following assessment and/or documentation of the identity infrastructure, the identity fabric installment module 377 may be configured to install the identity fabric (shown as identity fabric 318 in FIG. 3A) in the identity infrastructure based at least in part on the assessing.

In some embodiments, element agent detection module 376 (or event detection module 376) may be configured to detect and monitor, by the one or more elements or agents of the identity fabric (e.g., via API), at least one event associated with the one or more data flows 315. The element agent detection module 376 may initiate/spawn or otherwise work in conjunction with the one or more elements of the identity fabric, including, but not limited to, orchestrating agents 370, fabric connectors 305 for communications (e.g., the communicatively coupled connection or data flows 315) with the one or more identity domains (i.e., the identity management systems 316), controller elements 371, configuration agents 372, monitoring agents 375, and discovery agents 374, to detect and monitor events linked to data flows 315 through the identity fabric or via the fabric connectors. For instance, individual elements or agents of the identity fabric may detect and monitor data flows passing through them, and relay information pertaining to events linked to the data flows to the element agent detection module 376. In this way, the element agent detection module 376 may be able to monitor events linked to data flows pertaining to identity data or identity metadata received at the identity infrastructure. Alternatively, the individual elements or agents of the identity fabric may directly relay information pertaining to the events linked to the data flows to other elements or agents. As an example, a first orchestrating agent linked to a first identity system (e.g., identity system 316-*g*) may communicate directly with a second orchestrating agent linked to a second identity system (e.g., identity system 316-*h*). In some examples, more than one element agent detection or event detection module 376, orchestrating agent 370, configuration agent 372, discovery agent 374, and/or monitoring agent 375 may be deployed in the identity fabric.

In some examples, controller element 371 may be configured to coordinate and/or orchestrate behavior of elements or agents. For instance, the controller element 371 may indicate new traffic flows to proxy elements when one identity domain or identity system 316 is ready for retirement and anew identity workflow (i.e., data flow 315) is ready for production. Identity system 316 retirement may occur upon customer request—e.g., the customer is no longer using the system set for retirement. Additionally, or alternatively, the controller element 371 (or another agent, such as the orchestrating agent 370) may identify when a session (e.g., initiated to enable user access to an application) has ended, or when there is a new request to access an app. The controller element 371 may also configure the one or more orchestrating agents, monitoring agents 375, and identity cache modules 391, where the configuring may comprise: setting the periodicity for syncing/caching identity information to the identity cache module, and/or indicating the rules for caching identity information (e.g., identity cache module 391 is periodically synced even if no changes to identity information are detected at an identity system, and/or syncing or caching when the monitoring agent 375 detects a change at the identity system, to name two non-limiting examples), In some embodiments, the controller element 371 also may manage control plane operations across the individual elements, further described in relation to FIG. 6. Some non-limiting examples of control plane operations may include the updating of software versions or updating encryption certificate versions across the disparate identity systems 316. In some cases, the controller element 371 may also be configured to direct new elements or agents (e.g., orchestrating agents 370) to be spawned, or existing elements to be decommissioned. For instance, the discovery agent 374 can transform its behavior to become a configuration agent 372 or monitoring agent 375 after it has detected and documented an Apache configuration. Decommissioning occurs when system identity fabric elements are no longer required due to, for example, retirement of identity systems 316. A new monitoring agent 375 may be spawned when additional points of monitoring (such as a new web server) is installed, or an existing monitoring agent 375 may be decommissioned when its associated web server is removed.

Monitoring agents 375 and configuration agents 372 may be added to the identity infrastructure to assist in the management of the flow of identity data and identity metadata. In some embodiments, event data may be collected from the elements of the identity fabric by the monitoring agents 375 and/or configuration agents 372 and made available for audit and compliance. In some cases, the system 300-*b* may facilitate unified identity management across multiple identity systems 316 and/or cloud platforms, which may not only allow consistent identities across disparate IaaS clouds, but also policies, fundamentals of access control, and/or authentication. For instance, the system 300-*b* may enable an administrator for an organization to create unified policies, as well as consolidate rules (e.g., authentication rules, password rules, etc.), roles, groups, configurations, features, etc., across disparate identity systems 316 (e.g., IaaS clouds; on-premises or locally hosted identity systems, if any, that are controlled/managed by the organization). In this way, the system 300-*b* may allow the administrator to manage identities across the different identity systems in a unified manner, which may ease cross-platform compliance, auditing, and/or migration from on-premises systems to the cloud. By way of non-limiting example, managing the one or more data flows through the identity fabric (e.g., shown as identity fabric 318 in FIG. 3A) may include managing the one or more data flows 315 pertaining to identity data, where the identity data includes one or more of an authentication request, an authorization request, and an update of user attributes or credentials.

Figure 4:
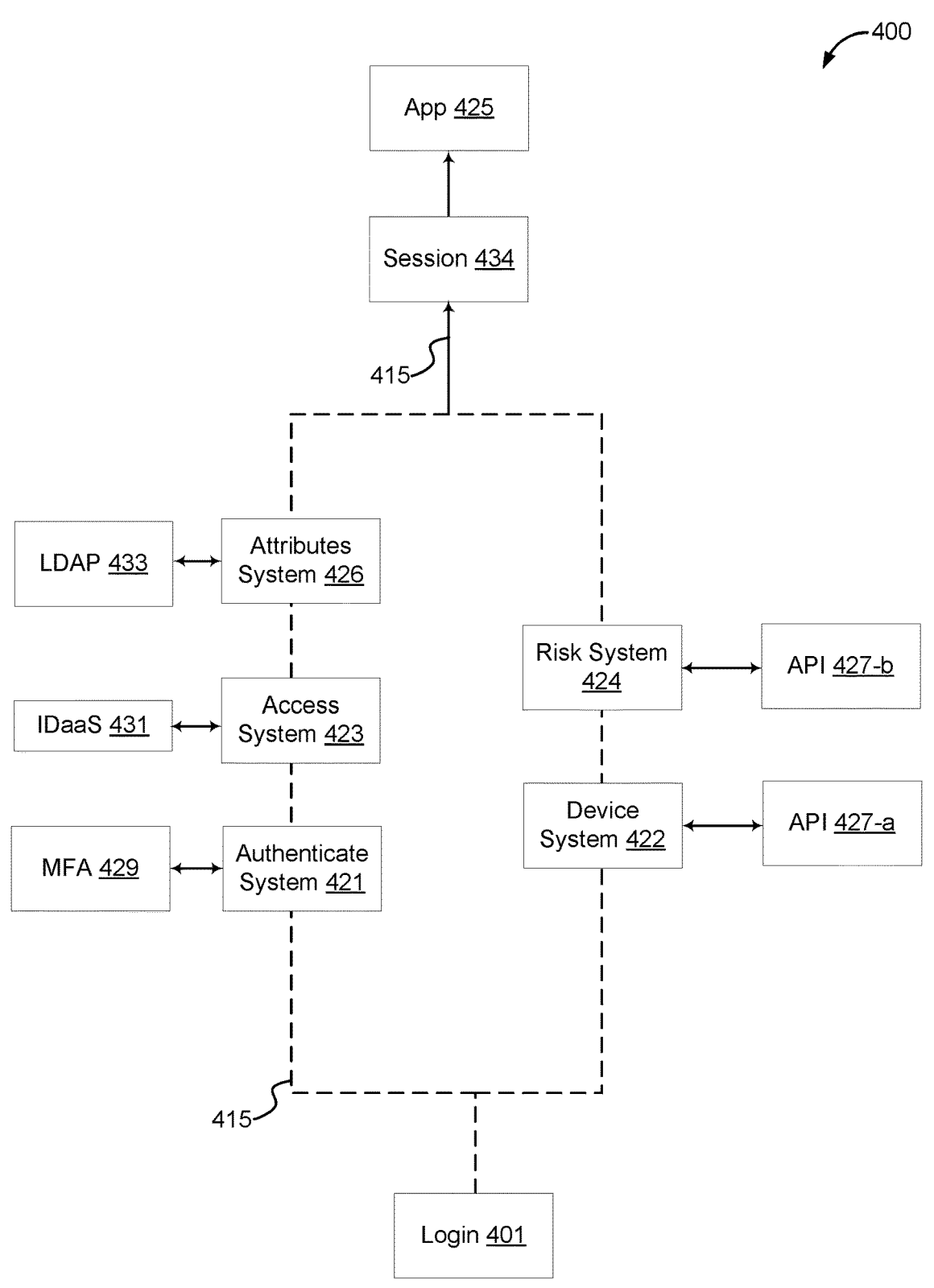
FIG. 4 illustrates a process flow for identity orchestration, according to an embodiment of the disclosure.

FIG. 4 illustrates a process flow 400 for identity orchestration according to an embodiment of the disclosure. In some examples, identity orchestration may be performed by an orchestrating agent, such as orchestrating agent 370 in FIG. 3B. Additionally, or alternatively, identity orchestration may also be performed by a configuration agent (shown as configuration agent 372 in FIG. 3B) and/or a monitoring agent (shown as monitoring agent 375 in FIG. 3B). In some cases, identity orchestration may comprise managing the one or more data flows through the identity fabric or via the fabric connectors, previously described in relation to FIGS. 1, 3A, and 3B. Identity orchestration may comprise managing identity data flows across multiple runtime systems (e.g., authenticate system 421, access system 423, attributes system 426, device system 422, risk system 424) for authentication (e.g., multi-factor authentication (MFA)), authorization, gathering identity attributes, retrieving threat or risk scores, and performing device verification, to name a few non-limiting examples. As shown, the process flow 400 may begin by a login 401 from a user. Login 401 may comprise receiving identity data, including one or more of a username, a password, a fingerprint, iris scan, voice input, unique identifier, unique pin, etc.

Following login, the user input may be relayed to any one of the runtime systems as an identity data flow 415. For instance, an orchestrating agent, such as orchestrating agent 870 in FIG. 8, acting as a proxy associated with the system (e.g., identity system 316 in FIG. 3B) may identify the login as identity data and manage the identity data flow 415 through the identity fabric (shown as identity fabric 318 in FIG. 3A) or via fabric connectors (shown as fabric connectors 305 in FIGS. 3A and/or 3B). In some cases, managing the one or more data flows through the identity fabric may comprise directing requests to one or more other elements or agents (e.g., monitoring and/or configuration agents, which, together with the fabric connector in some embodiments, and the configuration and monitoring agents, facilitate management of the flow of identity data and identity metadata) of the identity fabric. For example, upon a user entering login information to a system 316 or attempting to access a protected resource within the system 316 or on a network, an orchestrating agent may begin directing identity data flow 415, as described herein. Additionally or alternatively, managing the one or more data flows (i.e., identity data flow 415) through the identity fabric may comprise managing then one or more data flows pertaining to identity data, where the identity data comprises one or more of an authentication request (e.g., for authenticate system 421), an authorization request (e.g., for access system 423), an update of user attributes or credentials and/or a query of user attributes or credentials (e.g., for attributes system 426). In some embodiments, fabric connectors may be added to or work in conjunction with orchestrating agent(s) to facilitate communications with different identity domains or identity systems. Additionally, or alternatively, a plurality of orchestrating agents may be distributed among disparate IaaS cloud platforms (or identity systems) and may communicate with each other directly, or via the fabric connectors. For instance, an orchestrating agent (e.g., associated with identity system 316-a) may identify the login 401 as associated with a particular identity system (e.g., identity system 316-d in FIG. 3A) and coordinate with a corresponding fabric connector (e.g., fabric connector 305-d in FIG. 3A) or an orchestrating agent associated with identity system 316-d to direct the identity data flow 415 (e.g., login information) so that it is relayed to the appropriate identity system (i.e., identity system 316-d). In another case, the orchestrating agent may identify the login 401 as associated with another identity system (e.g., identity system 316-a in FIG. 3A) and may coordinate with fabric connector 305-a to direct the identity data flow 415 to the identity system 316-a. The fabric connectors 305-a and 305-d may utilize the same API (e.g., API 335-a) across identity systems 315-a and 316-d, thus allowing the system (e.g., system 300-a) to interact with either identity system equivalently. It should be noted that the fabric connectors 305-a and 305-d may comprise specialized code and/or instructions to facilitate interactions and control their behavior with their respective identity systems.

In this example, the identity data flow 415 may be sent to one or more of an authenticate system 421, an access system 423, an attributes system 426, a device system 422, and/or a risk system 424 associated with an identity system (e.g., shown as identity system 316 in FIG. 3B), to name a few non-limiting examples. In some cases, the identity flow 415 may be sent to other systems not identified herein. In some cases, the authenticate system 421 may support multi-factor authentication 429, the access system 423 may support identity as a service (IDaaS) 431 for authorization, and the attributes system 426 may be linked or associated with a Lightweight Directory Access Protocol (LDAP) 433 for gathering identity attributes. In some embodiments, the identity data flow 415 may pertain to identity metadata, and the managing may comprise setting one or more of access policies (e.g., a list of roles and the resources, such as apps, with which roles are provisioned), password rules (e.g., at least 8 characters long and includes one Uppercase, one lowercase, and a special character), and/or data locations (e.g., a specific datacenter, a server meeting certain security criteria, a specific country, such as the United States, a specific city, such as Denver, CO, etc.) of identity data and identity metadata in the identity infrastructure. In some cases, an identity may belong to one or more roles (e.g., User A may belong to the Administrator and User roles, while User B may only belong to the User role). In some circumstances, organizations may limit access to resources based on roles, for instance, by specifying roles which a user must be a member of to access the requested resource. In this way, an organization may utilize roles to create and manage the records of a collection of users to whom the organization wants to permit access to a common functionality, such as access rights, permissions, etc. In some cases, managing the one or more data flows via the fabric connector may comprise one or more of detecting and applying changes in an overall state of the identity infrastructure and/or acting upon an identity domain of the one or more identity domains or identity systems on behalf of the user or an administrator based at least in part on one or more identity-centric operations, as described herein with respect to the identity data, metadata, and identity elements.

In some examples, the one or more identity-centric operations may comprise at least one of authentication performed by the user (e.g., login 401 and authentication by authenticate system 421), a request for permission to access a protected resource by the user (e.g., request to access app 425), an update to user attributes or credentials by the user (e.g., in attributes system 426), and setting of access policy rules by an administrator (e.g., in access system 423). In one non-limiting example, the detection of a password change in one identity domain (e.g., a password change in identity system 316-c in FIG. 3A) as it is proxied through a fabric connector (e.g., fabric connector 305-c) may necessitate a corresponding change in another identity domain (e.g., identity system 316-b). In such cases, the fabric connectors (or alternatively, the orchestrating agents or the monitoring agents) associated with the different identity domains or systems may be configured to communicate directly (e.g., data flow 315 between fabric connectors 305-c and 305-b, where the data flow 315 is transported over a secure channel), or via one or more other agents or modules (e.g., fabric connector 305-*c* may relay an indication of the password change in identity system 316-*c* to an element agent detection module 120).

In the example shown, the device system 422 may be linked or associated with a first custom API 427-*a*, which may be configured to perform device verification, and the risk system 424 may be linked or associated with a second custom API 427-*b*, which may be configured to retrieve a threat or risk score. In some embodiments, the APIs 427-*a* and/or 427-*b* may link the device system 422 and/or risk system 424, respectively, to one or more applications (not shown), where the one or more applications may be third-party applications. In some cases, the one or more third party applications may be executed or hosted on another server (not shown). For instance, the device system 422 may be configured to interact with a third-party device verification application by making a call (e.g., an API call) using API 427-*a*. The third-party device verification application may then process the information received from the device system 422 (e.g., via the API 427-*a*) and relay a response (e.g., Verified or Not verified, 1 or 0, Yes or No, etc.) to the device system 422, based on which the user device from which the login 401 was received may be verified. In some cases, the device system 422 may receive the response via the API 427-*a*. In some cases, the risk system 424 may also interact with a third-party risk verification application by making an API call using API 427-*b*, where the third-party risk verification application may then relay a response back to the risk system 424 via the API 427-*b*. In some embodiments, the third-party risk and verification applications may be executed or hosted on the same or a different third-party server. In some cases, device verification may serve as an added level of security (i.e., in addition to a username and password, for instance) and may be used to verify that the login 401 is coming from a recognized device (e.g., mobile device, laptop, computer, etc.) associated with an authorized user. In some cases, device verification may comprise transmitting a verification code over text (SMS), a phone call, an app, etc., to a recognized device associated with the user. The device system 422 may verify the device from which the login 401 was received upon the user inputting the same verification code. In some cases, the threat or risk score may be associated with a perceived or estimated threat level (e.g., for a user's identity), and may be based on one or more factors, including, but not limited to, time of day, day of week, geographic data, and/or IP address. For instance, a higher risk score may be assigned when the login 401 is during non-working hours (e.g., 3 AM) as compared to during working hours (e.g., 11 am). In another example, a lower risk score may be assigned when the login 401 is from a known IP address as opposed to unknown IP address. In yet another example, a higher risk score may be assigned when the login 401 is from a geographic region (e.g., city, state, country, etc.) that the user has never logged in from before.

In some cases, the risk system 424 may be configured to authorize or flag the login 401 based in part on comparing the retrieved risk or threat score to a threshold. In one non-limiting example, the login 401 and access to resource (e.g., app 425) may be denied based on the risk score exceeding the threshold. In another example, the user requesting the login 401 may be prompted to change their password based on receiving a link or code on a registered device. In this case, the user may need to first click the link or input the code received on their registered device (e.g., a smartphone associated with the user) and then proceed to update their password. The user may then restart the login 401 process via the one or more runtime systems. Alternatively, if the risk or threat score is under a threshold, the login 401 may be successful and a session may be initiated 434 (e.g., the user device may display a Welcome Screen with one or more links to access different apps or resources, including app 425).

The orchestrating agent (if any) specific to the identity system may facilitate authentication, device verification, risk assessment, etc., if it detects an outage at the identity system (i.e., identity system is offline). In such cases, the orchestrating agent (shown as orchestrating agent or orchestrator 970 in FIG. 9) may directly communicate with the third-party applications described above. In some aspects, the orchestrating agent working in conjunction with the identity cache module (shown as identity cache module 991 in FIG. 9) may be used in lieu of one or more of the authenticate system 421, MFA 429, access system 423, attributes system 426, LDAP 433, IDaaS 431, the risk system 424, API 427-*b*, device system 422, and API 427-*a* of the unavailable/offline identity system. In one non-limiting example, the third-party application (e.g., used for device verification) may transmit a onetime password (OTP) or another code to the same or a different user device (i.e., different device than the one from which the login 401 was received) associated with the user and transmit the same OTP or code to the orchestrating agent. In this way, the orchestrating agent facilitates a multi-factor authentication communication even when the identity system is offline. Specifically, the orchestrating agent can compare the OTP/code received from the third-party application to the one displayed to the user (i.e., on the same or different user device from which the login 401 was received) and validate the user's identity before enabling the user to access the app 425. In this way, the system of the present disclosure, by way of at least the orchestrating agent and identity cache module, helps ensure continuity of identity-centric operations in the event of an unforeseen identity system outage.

It should be noted that the identity data flow 415 may interact with any of the runtime systems illustrated in FIG. 4, and in any order. In some other cases, the identity data flow 415 may interact with different runtime systems in parallel (e.g., authenticate system 421 and device system 422 simultaneously). In other cases, the identity data flow 415 may interact with the runtime systems in a first branch (e.g., the left branch in FIG. 4), followed by the runtime systems in the second branch (i.e., right branch). Once the identity data flow 415 has been relayed across the one or more runtime systems (e.g., by the one or more agents or elements in the identity fabric, such as the orchestrating agent, fabric connector, monitoring agent, etc., associated with the identity domain), the process 400 may comprise initiating session 434 (also shown as the first identity session 907 and/or second identity session 910 in FIG. 9) and providing the user access to app 425. In some cases, a session may refer to a temporary and interactive information interchange between two or more communicating devices (e.g., a user device associated with login 401 and a server hosting app 425). Further, an established session may be a prerequisite for performing a connection-oriented communication. In some cases, a session may be initiated or established before data is transferred. As described above, session initiation 434 may comprise displaying a successful login screen or welcome screen with one or more links to resources or apps authorized for use by the user, for instance, which may be indicative of a connection between the user device and the server hosting the app 425.

In some cases, elements or agents of the identity fabric may be configured to individually authenticate and authorize communications with other elements of the identity fabric. In some examples, communications between the one or more agents or elements of the identity fabric may be secured via transport layer security. Further, the system may be configured to authenticate incoming messages (e.g., data flow 315 in FIG. 3A) from a message originator via key/certification matching. One such matching occurs via a secondary layer of security between the components of the fabric which ensures the component that initiates the communication presents proper security credentials. Additionally, or alternatively, the system may be configured to check the incoming messages for authorization (e.g., via tokens such as OAuth and/or JWT) to confirm that the message originator has been granted appropriate permissions for the message contents, for instance. In some cases, OAuth may refer to an open standard for access delegation and is a commonly used industry standard protocol for authorization. Further, JWT may refer to JSON Web Tokens, which is an open standard that defines a compact and self-contained way for securely transmitting information between parties as a JSON object. In some cases, JWTs may be signed used a secret (e.g., with an HMAC algorithm, which uses a cryptographic hash function and a secret cryptographic key) or a public/private key pair using RSA (a public-key cryptosystem) or an Elliptic Curve Digital Signature Algorithm (ECDSA).

Figure 5:
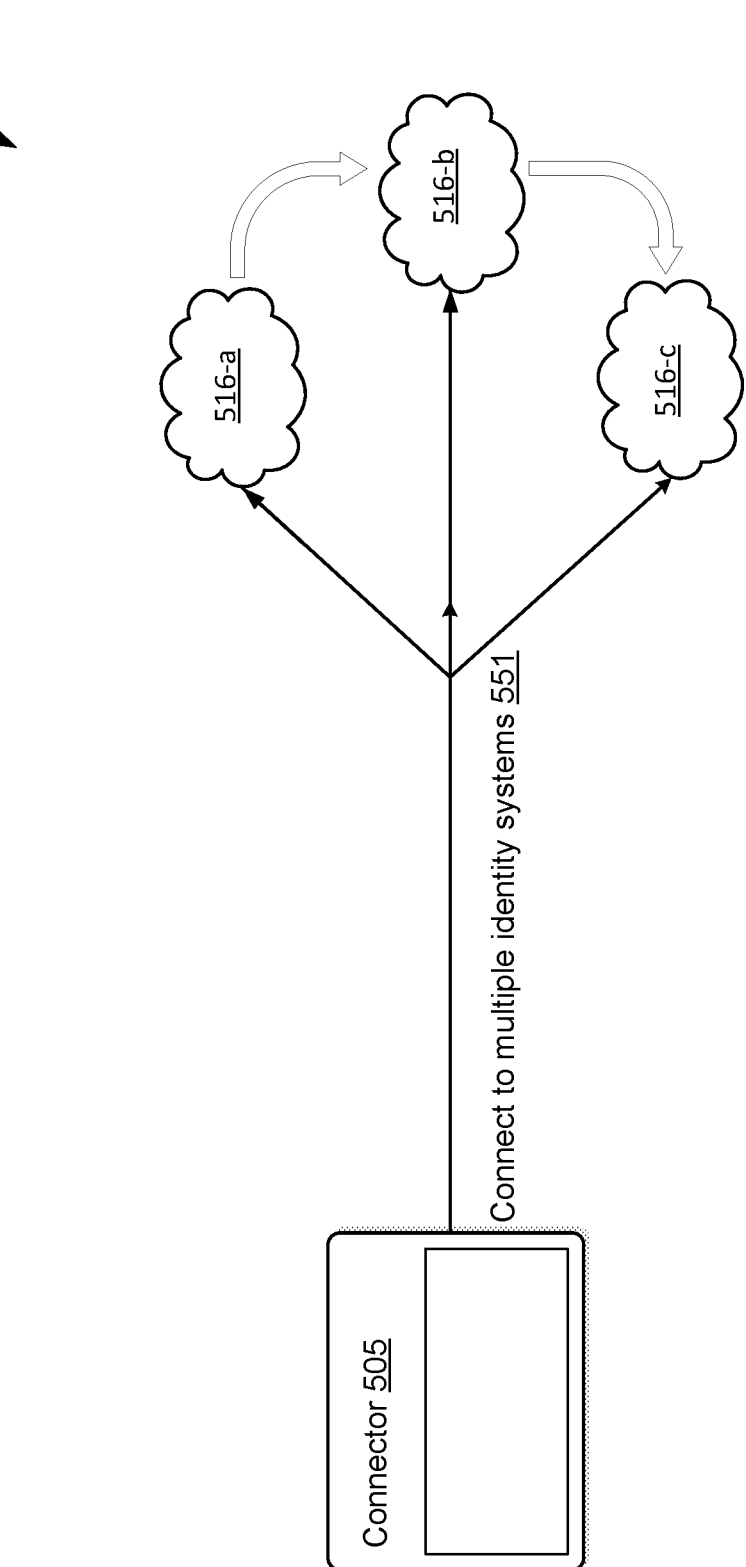
FIG. 5 illustrates a process flow for integrating identity across multiple identity systems according to an embodiment of the disclosure.

FIG. 5 illustrates a process flow 500 for integrating identity data across multiple existing identity systems (e.g., identity systems 316 seen in FIG. 3A) according to an embodiment of the disclosure. In some cases, the system of the present disclosure may allow an enterprise or organization to connect 551 multiple identity systems 516 (e.g., identity system 516-a, identity system 516-b, identity system 516-c) using at least one connector 505. In some examples, the at least one connector 505 may be a fabric connector. As shown, the at least one connector 505 may be used to connect 551 to the multiple identity systems. In some other cases, there may be a connector for each of the different identity systems 516 (e.g., shown as connectors 305 in FIG. 3A). In some cases, the connector 505 may be a general purpose last-mile connector configured to work with a plurality of applications (e.g., web apps) running on different cloud platforms or identity systems 516. In some other cases, the connector 505 may be an on-premises identity connector configured to work with SYMANTEC SITEMINDER provided by Broadcom, Inc., of San Jose, CA, ORACLE ACCESS MANAGER (OAM) provided by Oracle Corporation of Austin, TX, ACTIVE DIRECTORY (AD) provided by Microsoft Inc., of Redmond, WA, PING FEDERATE/ACCESS provided by Ping Identity Corporation of Denver, CO, WS02 provided by WS02 of Colombo, Sri Lanka, to name a few non-limiting examples. In yet other cases, the connector 505 may be a cloud identity connector configured to work with OKTA provided by Okta, Inc., of San Francisco, CA, AZURE AD provided by Microsoft Inc., of Redmond, WA, AWS IDENTITY provided by Amazon, Inc., of Seattle, WA, GCP IDENTITY provided by Alphabet, Inc., of Mountain View, CA, to name a few non-limiting examples. The connector 505 may support workflows and may be deployed for helping with identity integration across systems 316, 516, such as identity migration, last mile single sign on (SSO), session abstraction, identity replication (e.g., replicate user authorization policies to apps or resources deployed on different identity systems to ensure consistency), and/or identity data and/or metadata synchronization across clouds. In some cases, last mile SSO or last mile integration refers to the application side connection, which presents the application to the user. For instance, after user authentication (e.g., via a security token), the user may be provided access to the protected application via the last-mile connection between a server, such as a federation server (e.g., a server placed behind a firewall in an organization to authenticate user credentials) or another server (e.g., operated by a cloud platform hosting the app) and the application. In some cases, the user may be presented to the application which then creates (or initiates) a session and renders the application for the authenticated user.

In some cases, the connector 505 may facilitate configuring workflows for identity integration, which may enable apps to be run across different identity systems. In some cases, the workflow may comprise one or more of user authentication, session creation, connecting identity to app, etc. Current techniques for identity integration are lacking. For instance, in some circumstances, apps integrated with legal identity systems, such as an on-premises identity system, may need to be rewritten to work with a new identity system, such as a cloud-based identity system. In some cases, the time and cost needed to rewrite apps may be significant, which may deter organizations from moving to the cloud. According to aspects of this disclosure, workflow actions, such as user authentication, session creation, etc., may be performed through connectors, such as connector 505, which may be configured to integrate with legacy and cloud identity systems. In some regards, the connector 505 may optimize identity integration and minimize time and cost spent on rewriting apps to work with different identity systems.

In some cases, connectors may serve to accelerate deployment and provide an identity fabric (shown as identity fabric 318 in FIG. 3) for running apps at different geographic locations and on different identity management systems or cloud platforms. In some cases, the system of the present disclosure may also allow a user (i.e., client, administrator, etc.) to switch between identity platforms (i.e., identity systems 516) and/or move identity data and associated identity data requests between different geographic regions or regulatory areas, shown by the arrow signs. In some cases, different geographic regions or regulatory areas may enforce different identity regulatory constraints (e.g., General Data Protection Regulation (GDPR) in the EU). Additionally, or alternatively, the at least one connector 505 may allow the enterprise or organization to consistently manage identity and access for apps running on the multiple identity systems 516. For instance, with the system of the present disclosure, a client may integrate silos of identities across the different identity systems 517 (e.g., in the cloud, on-prem, hybrid, etc.) to enforce consistent policies (e.g., shown by the arrow signs). Additionally, or alternatively, the system may allow the client running an app on a first identity system 516-a to seamlessly switch the app to run on identity system 516-b and/or identity system 516-c, for instance.

FIG. 6 illustrates a system level diagram 600 of an identity control plane for managing control plane operations according to an embodiment of the disclosure. In some examples, a controller element (e.g., shown as controller element 371 in FIG. 3B) may be configured to manage control plane operations across the one or more elements or agents in the identity fabric. The system of the present disclosure may support a multi-cloud identity control plane that is configured to work as an abstraction layer (e.g., for decoupling apps from identity). As shown, a client or user may utilize multiple platforms for storing data, running applications, etc., for their work force and/or their clients. In some cases, the platforms may comprise a mix of on-premises platforms, disparate IaaS clouds, private cloud platforms, and/or hybrid cloud platforms. A private cloud platform may refer to a platform providing a on-demand configurable pool of shared resources allocated within a public cloud environment and providing a certain level of isolation between the different organizations using the resources. One non-limiting example of a private cloud is AWS VIRTUAL PRIVATE CLOUD (VPC) provided by Amazon, Inc., of Seattle, WA. In some cases, public or IaaS cloud may refer to a cloud platform delivering cloud infrastructure as a service (IaaS). Some non-limiting examples of public clouds may include GOOGLE DRIVE provided by Alphabet, Inc., of Mountain View, CA, AMAZON AWS provided by Amazon, Inc., of Seattle, WA, AZURE provided by Microsoft Inc., of Redmond, WA, DROPBOX provided by Dropbox Inc., of San Francisco, CA, etc. In such cases, a client or user may essentially rent a slice of the distributed data center infrastructure owned by another entity. Further, a hybrid cloud may refer to a type of cloud computing that combines on-premises infrastructure or a private cloud with a public cloud. In some examples, hybrid clouds may be configured to allow data and/or apps to move between the two environments. In the example shown in FIG. 6, a client or user may be utilizing one or more platforms 652 (e.g., platform 652-*a*, platform 652-*b*, platform 652-*c*, platform 652-*d*), each running one or more apps 625 (e.g., apps 625-*a* on platform 652-*a*, apps 625-*b* on platform 652-*b*, apps 625-*c* on platform 652-*c*, apps 625-*e* on platform 652-*d*). In some embodiments, a client organization may also utilize an identity and access management (IAM) platform, such as OKTA provided by Okta, Inc., of San Francisco, CA, for running one or more Software as a Service (SaaS) apps 625-*d*. In this example, platforms 652-*a*, 652-*b*, and 652-*c* may be examples of private, public, and/or cloud computing platforms managed by third party entities, while platform 652-*d* may be an example of an on-premises platform that is locally hosted, installed, and/or managed by the client organization. As seen, each platform 652 may be associated with its own IAM system 651 (e.g., IAM system 651-*a*, IAM system 651-*b*, IAM system 651-*c*, IAM system 651-*e*). In some cases, going multi-cloud (e.g., deploying apps that span multiple cloud platforms) may entail managing new identity silos that come with each IaaS cloud. As noted above, in some circumstances, each cloud may have varying capabilities, making consistent management of user access policies (e.g., setting one or more of access policies, password rules, data locations of identity data and metadata, etc.) challenging. Further, manual efforts to manage a large number of policies may lead to drift and/or unintentional access exposure, since each IAM system 651 and/or authentication system (e.g., shown as authenticate system 421 in FIG. 4) may comprise one or more APIs, requiring custom coding and/or maintenance.

As illustrated, the client organization may also utilize one or more existing identity systems 616 (e.g., identity system 616-*a*, identity system 616-*b*, identity system 616-*c*, identity system 616-*d*) for identity management and/or access control. The existing identity systems 616 may be on site (i.e., hosted locally within the control of the client organization). Further, the client organization may also utilize one or more policy systems (e.g., policy systems 617-*a*, 617-*b*, 617-*c*, 617-*d*) for one or more of authenticating and authorizing users, computers, etc., in a network domain, assigning and enforcing policies for devices, installing or updating software, etc. Some non-limiting examples of identity systems

616 may include SITEMINDER provided by Broadcom, Inc., of San Jose, CA, ORACLE OAM provided by Oracle Corporation of Austin, TX, CLEARTRUST provided by RSA Security, LLC of Bedford, MA, and ACTIVE DIRECTORY provided by Microsoft Inc., of Redmond, WA. Further, the one or more policy systems 617 may utilize one or more of a Lightweight Directory Access Protocol (LDAP), a policy database, multi-factor authentication (MFA) techniques, and/or APIs. Thus, the identity infrastructure for the client organization may comprise the identity systems 616, the policy systems 617, the one or more platforms 652, and the one or more IAM systems 651.

In some cases, at least one discovery agent element may assess the identity infrastructure, where the assessing includes detecting and reporting identity data and/or identity metadata from the identity infrastructure. Next, an identity fabric may be installed in the identity infrastructure, shown as identity fabric 318 in FIG. 3A, the identity fabric comprising one or more elements or agents in communication with each other, the elements or agents including one or more of orchestrators or orchestrating agents, fabric connectors 605 (e.g., fabric connectors 605-*a*, 605-*b*, 605-*c*, 605-*d*, 605-*e*) utilizing a common API for communications with the one or more identity domains (e.g., identity systems 616, IAM systems 651, etc.), configuration agents (shown as configuration agent 372 in FIG. 3B), monitoring agents (shown as monitoring agents 375 in FIG. 3B).

In some cases, one or more authentication and/or authorization policies may have been pre-defined to protect the applications or resources, such as apps 625. In this case, the client organization wishes to extend their on-premises identity systems 616 to the cloud and integrate with the cloud. In some embodiments, the system of the present disclosure provides an identity infrastructure software, where the identity infrastructure software is adapted to integrate with multiple cloud platforms, cloud identity systems, and/or on-premises identity and app infrastructures. The session abstraction may comprise creating composite identity profiles from the multiple identity systems 616. For instance, after receiving one or more data flows linked to at least one event (e.g., a login, access request to a resource or app 625, password reset or password update, etc.), one or more composite identity profiles may be created. Further, at least one of the orchestrating agent 670-*a*, 670-*b*, configuration agent, or monitoring agent, may manage the one or more data flows through the identity fabric via the fabric connectors 605. In some other cases, session abstraction comprises enabling a central policy configuration (e.g., for access policies) from the policy systems 617 to the multiple platforms 652. In some cases, an orchestrating agent, such as orchestrating agent 670-*a* or 670-*b* may be used to manage the policies of built-in identity systems, such as IAM systems 651, directly or via the fabric connectors 605. In this way, the client organization may be able to deploy their existing authentication and/or authorization policies, as well as allow their workforce and customers to run apps 625 on the various platforms 652.

In some examples, managing control plane operations comprises one or more of: updating software versions or certificate versions in the identity infrastructure, spawning one or more new elements or agents (e.g., spawning the orchestrating agent 670-*a* and/or fabric connector 605-*a*, which may be specific to the IAM system 651-*a* and platform 652-*a*; spawning the orchestrating agent 670-*b* and/or fabric connector 605-*e*, which may be specific to the IAM system 651-*e* and platform 652-*d*) or decommissioning one or more existing elements or agents in the identity fabric, indicating, by the controller element (shown as controller element 371 in FIG. 3B), an indication of a new traffic flow to one or more elements or agents based at least in part on identifying a new identity workflow (e.g., identifying a new identity workflow via fabric connector 605-*a*, and indicating the same to the other fabric connectors 605), etc. Additionally, or alternatively, managing control plane operations may comprise managing consistent user identity and access policies for apps 625 deployed across the multiple platforms (i.e., platforms 652-*a*, 652-*b*, etc.). In some cases, managing consistent user identity and access policies may be based on session abstraction, for instance, using an abstraction layer, where the abstraction layer may be integrated with the multiple identity domains used by the client organization. In some examples, the orchestrating agent(s) 670 may be electronically, logistically, and/or communicatively coupled to one or more of the IAM system(s) 651, platform(s) 652, fabric connector(s) 605, app(s) 625, and/or identity cache module(s) 691 (e.g., identity cache modules 691-*a*, 691-*b*), shown by way of the dashed lines. For the sake of brevity, FIG. 6 only depicts two orchestrating agents 670-*a*, 670-*b*, but it should be understood that each identity silo may be associated with a different orchestrating agent. For instance, an identity silo comprising IAM system 651-*b*, platform 652-*b*, and apps 625-*b* may have an orchestrating agent that is communicatively coupled to the fabric connector 605-*b*. Similarly, an identity silo comprising IAM system 651-*d* and apps 625-*d* may be linked or associated with another orchestrating agent, monitoring agent, and/or configuration agent, at least one of which may be coupled to the fabric connector 605-*d*. While not necessary, in some cases, the identity cache module(s) 691-*a*, 691-*b* may be similar or substantially to each other and may implement one or more aspects of the identity cache modules 891, 991 described below in relation to FIGS. 8 and/or 9. In some cases, the distributed identity management environment may utilize a single identity cache module for the different identity systems or identity silos, in which case the identity cache modules 691-*a* and 691-*b* are the same identity cache module. Additionally, the identity cache module (e.g., identity cache module 691-*a*) may be communicatively coupled to each of the different orchestrating agents, IAM systems, identity systems, and/or apps.

In addition to the above, the following is also related and/or comprises one or more embodiments of the disclosure. The identity fabric, such as identity fabric 318 in FIG. 3A, is the term of art applied to the collection of the elements described herein and their collective and coordinated behavior. Identity data refers to individual users' data, including their credentials and attributes. Identity metadata is information about how identity is managed and coordinated. This may include password rules, authorization policies, network location of elements of an identity domain, etc. An identity domain is a self-contained realm with consistent identity data and identity metadata throughout along with the mechanism to enforce access control and other policies. Examples of an identity domain include an Active Directory domain or a Web Access Management (WAM) deployment such as an OKTA implementation for a specific company. Orchestrating agent(s) work to direct flow of identity data through the identity fabric, directing requests to other elements or agents in the identity fabric or to appropriate identity domains. In some cases, the identity domain may be referred to as an identity system. In some embodiments, an orchestrating agent transforms data flows and actions for an identity domain via a fabric connector. This could be to detect and apply changes in the overall state of the identity infrastructure, or to act upon a given identity domain on a user's or administrator's behalf. Examples of these interactions include when a user performs an authentication or requests permission to access a protected resource (e.g., app 625-*a*), or when the user updates their attributes or credentials. Other interactions may include the setting of access policy rules by an administrator. In some cases, fabric connectors, such as fabric connectors 605, may implement a specified set of behaviors or instructions to be utilized within the system, where the instructions may be written in any language, for instance, as long as they meet the defined API. In some cases, the fabric connectors may be 'low code' in that they act as a facade layer between an element (such as an orchestrating agent or orchestrator) in the identity fabric and an individual identity domain. Fabric connectors may use the same API across disparate identity domains or identity systems. This may allow the system (e.g., system 100 in FIG. 1, system 300-*a* in FIG. 3A) to interact, equivalently, with a plurality of identity domains or systems with specialized code and behavior contained within the fabric connectors.

Additional elements of any type may be added into the identity fabric as needed, which may or may not require a rebuild or restart of the system as a whole. This may be a proscribed process as additional functionality necessitates additional elements, or it may be an automated process that occurs in reaction to environmental changes, e.g., additional elements are spawned to handle spikes in traffic.

The identity fabric and the elements of which it is composed may span multiple conceptual domains. These domains may include network domains, cloud providers, IaaS clouds, identity domains (i.e., identity systems or identity access management systems), geographic locations, etc. Such a configuration may enable the identity fabric to coordinate behavior across the identity infrastructure, which itself spans said domains. In some examples, each element in the identity fabric may be configured to communicate with any other element for choreography of behaviors. For example, the detection of a password change in one identity domain or identity system (e.g., identity system 616-*a* in FIG. 6) as it is proxied through a fabric connector (e.g., fabric connector 605-*a*) may necessitate a corresponding change in another identity domain (e.g., associated with platform 652-*a*). In some cases, one or more of an orchestrating agent (e.g., orchestrating agent 670-*a*), a configuration agent, or a monitoring agent, may detect the password change. Further, the agent or element may manage the data flow through the identity fabric via the fabric connector (e.g., fabric connector 605-*a*) and assess the identity data or its state in the identity domain (e.g., associated with platform 652-*a*). The two elements may be able to communicate directly via a secure communication channel to coordinate this change.

Behavior of elements may also be coordinated and orchestrated from a controller element (e.g., shown as controller element 371 in FIG. 3A). For example, the controller element may indicate new 'traffic flows' (also referred to as data flows, identity workflows) to proxy elements (e.g., orchestrating agent, fabric connector, configuration agent, monitoring agent) when one identity domain is ready for retirement and a new identity workflow is ready for production. Additionally, or alternatively, the controller element manages 'control plane' operations across the individual elements or agents. Examples of this include the updating of software versions or updating encryption certificate versions, supporting consistent identity related information across identity systems or cloud platforms, etc. It can also direct new elements to be spawned or existing elements to be decommissioned. For instance, once the discovery agent has assessed the identity infrastructure, it may be decommissioned or adapted to perform the functions of another element, such as a monitoring agent.

Furthermore, the elements of the identity fabric are able to individually authenticate and authorize communication with other elements of the identity fabric. Each communication may be secured via Transport Layer Security (TLS) for secrecy and authenticated by key/certificate matching for identification and authentication of the incoming messages. After authentication is established, the message may be checked for authorization via tokens (e.g., OAuth, JWT) or other applicable technologies, to confirm that the message originator has been granted appropriate permissions for the message contents.

Direct communication between any two elements, such as between two fabric connectors, may be used to request actions or report events in a one-on-one manner. Additionally, or alternatively, events may be generated and shared with the system as a whole. Elements may be able to monitor these events and react accordingly and autonomously or in concert.

In some embodiments, events may also be recorded in long-term storage for future use, for instance, using an event system. The long-term storage of the complete catalogue of events affecting the system may allow for generation of historical state and prediction of system behavior in that past state. It may also allow for assessment of identity data and/or an identity data state across identity domains from one centralized location (e.g., system 300-a in FIG. 3A is in a centralized location with respect to the multiple identity systems and cloud platforms), which may aid compliance and auditing efforts.

In some embodiments, discovery agent elements may be used to assess and document the established identity infrastructure. Assessment and documentation may be performed before any other elements are in place within the system and may be considered as a precursor to installation of the identity fabric. As noted previously, the discovery agents may be installed on or adjacent to critical identity infrastructure elements, e.g., on an Apache or Nginx server, or on the control elements of an established identity domain, such as an Oracle Access Manager (OAM) Server. In some cases, the discovery agent may be configured to detect and report identity data and identity metadata from the established identity infrastructure. Examples include user identities and attributes, configuration of the identity infrastructure and its flows, and authorization policies and rules. The discovery agent—and any element described herein—has the ability to mutate its purpose and become an element of another type. For example, after detecting and documenting an Apache configuration, the discovery agent may transform its behavior to become a configuration agent or a monitoring agent.

In some other cases, an individual element may behave as more than one type as defined above. An agent installed on an Apache Server, for instance, might act as both a configuration agent and a monitoring agent.

The elements of the identity fabric may act in concert to apply meta-behavior across multiple identity domains. An example of this includes moving or directing identity data and associated requests to particular geographic regions in order to comply with identity regulatory constraints. One such regulatory constraint may comprise the European Union's and European Economic Area's General Data Protection Regulation (GDPR) 2016/679 and/or the California Consumer Privacy Act (CCPA). Other regulatory constraints known or unknown at the time of filing are also contemplated. The locations in which such regulatory constraints apply, or conversely, do not apply, may be referred to herein as "regulatory areas".

As used herein, in some cases, the term "intermediary" may be used to refer to an agent, such as, but not limited to, an orchestrating agent or orchestrator. One such intermediary may comprise the orchestrating agent 870, 970 described below in relation to FIGS. 8 and 9, respectively. In other cases, an intermediary comprises one or more elements or agents in addition to, or in lieu of, an orchestrating agent. In one non-limiting example, an intermediary comprises an orchestrating agent (e.g., orchestrating agent 370 in FIG. 3B). In another example, an intermediary comprises an orchestrating agent (e.g., orchestrating agent 370) and one or more of a monitoring agent (e.g., monitoring agent 375), a configuration agent (e.g., configuration agent 372), and a fabric connector (e.g., fabric connectors 305, 605). In some other cases, an intermediary comprises one or more of a controller element (e.g., controller element 371), a monitoring agent (e.g., monitoring agent 375), a configuration agent (e.g., configuration agent 372), and a fabric connector (e.g., fabric connectors 305, 605). In some aspects, an intermediary (1) helps coordinate and orchestrate identity information and data flows through a distributed identity management environment or identity infrastructure, (2) manage control plane operations across the one or more elements or agents installed in the identity infrastructure, e.g., if the intermediary comprises the controller element, and/or (3) serves as a proxy and intercepts user requests to access an application or app, where the access is protected by way of an identity system, to name a few non-limiting examples. In some cases, managing control plane operations comprises coordinating the operations and configurations of a plurality of elements or agents, such as, the orchestrating agent, monitoring agent, etc., that are dispersed or distributed across one or more cloud identity systems.

FIG. 8 illustrates a process flow 800 for controlling user access to one or more applications, according to various aspects of the disclosure. The process flow 800 may be implemented by way of the system(s) 100, 300-a, and/or 300-b described above. FIG. 8 depicts a user device 880 (e.g., smartphone, laptop, desktop computer), a data center 899, and an identity system 816. The data center 899 may be an example of a local data center installed at a client's facility, where the client may be an enterprise or an individual. As noted herein, the system (e.g., system 300-a) may be utilized to manage identity infrastructure associated with the applications such as apps 825-a, 825-b, and/or 825-c using one or more orchestrating agents, such as orchestrating agent 870. In this example the orchestrating agent 870 is installed at the data center 899 and controls user access to apps 825-a, 825-b, and/or 825-c. In some cases, the identity system 816 is associated with an identity provider, where the identity provider is used to authenticate the user and enable user access to the app(s) 825 based on the authentication.

The orchestrating agent 870 serves as a proxy or an intermediary and intercepts user requests to access the app(s) 825. For example, the orchestrating agent 870 receives a request to access one or more of the app(s) 825 from the user device 880 in dataflow 815-a. The orchestrating agent 870 then determines a status (e.g., unavailable or offline, available or online) for the identity provider associated with the identity system 816, shown by dataflow 815-b. In some cases, the orchestrating agent 870 transmits a message (in dataflow 815-b) to the identity provider requesting a status update. In some circumstances, the identity provider may be offline (or unavailable) and may not respond to the status update request from the orchestrating agent 870, for instance, within a threshold period of time (e.g., 200 milliseconds, 500 milliseconds, 1 second, 5 seconds, to name a few). In such cases, the orchestrating agent 870 determines that the identity provider will not be able to process the user request to access the application (e.g., app 825), where the processing includes authenticating the user, checking whether the user is authorized to access the one or more app(s) 825, and optionally transmitting a user authentication confirmation to the intermediary (or orchestrating agent 870) indicating that the user may be granted access to the app(s) 825. If the orchestrating agent 870 determines that the identity system 816 (or identity provider) comprises an unavailable status, it proceeds to request additional information from the user 881 in dataflow 815-*c*.

In accordance with aspects of the present disclosure, the orchestrating agent 870 may be electronically, logistically, and/or communicatively coupled to an identity cache module 891. Furthermore, the identity cache module 891 may periodically synchronize (directly, or via the orchestrating agent 870) with the identity system 816 and store a local cache of a subset of at least one of identity metadata and identity data associated with a plurality of users, including at least the user 881. This cached identity data and/or identity metadata information may be used for authentication and authorization decisions, e.g., in response to a user request to access an application. By storing a subset of the application identity information (i.e., identity data and/or identity metadata) to a local cache (e.g., by way of the identity cache module 891), the orchestrating agent 870 may be able to validate the user 881 even if the identity provider is offline.

Once the user 881 receives the request for additional information from the orchestrating agent 870 and provides said information (in dataflow 815-*c*), the orchestrating agent 870 validates the user by referencing the cache stored in the identity cache module 891 (shown by dataflow 815-*d*). If user validation is successful (i.e., user identity is authenticated and access to app(s) 825 is authorized), the orchestrating agent 870 helps enforce user access to the one or more app(s). The user 881 is then granted access to the one or more app(s) 825, shown by dataflows 815-*e*, 815-*f*, and/or 815-*g*. In some examples, the identity cache module 891 is electronically, logistically, and/or communicatively coupled to the orchestrating agent 870 and the identity provider (or identity system 816). The cache stored at the identity cache module 891 may be periodically synced with the identity provider via the orchestrating agent 870. In some cases, the identity system 816 (or identity provider) may be an example of a cloud identity provider.

In some cases, the identity data (e.g., used by the identity provider or identity system 816) comprises at least one of a user identifier, a username, and a password. The identity system 816 may also employ multi-factor authentication (MFA) to validate the user 881 and enable access to the application, for instance, if the identity system is available or online. In some examples, when the identity system/provider 816 is offline, the additional information (e.g., identity data) requested by the orchestrating agent 870 may include one or more of: requesting login information from the user 881, where the login information includes at least a username and a password; requesting answers to one or more security questions or challenge questions; and requesting additional user data (or identity data) from the user 881, where the additional user data comprises at least one of a user identifier, a user first name, a user last name, a job title, a physical address, an email address, a PIN or alphanumeric code previously set by the user, and information related to a social security number (e.g., last 4 digits of social security number). In some cases, the identity cache module 891 may be used to store any of the application identity information and/or the additional information described above, which helps the orchestrating agent 870 make authentication and authorization decisions when the identity system 816 is offline. For example, the subset of identity data stored at the identity cache module 891 may comprise one or more of login information for the user 881, the one or more security/challenge questions (e.g., mother's maiden name, name of first pet), respective answers to each of the one or more security questions (e.g., Smith, Barkley), and the additional identity data or user data, where the additional identity/user data comprises at least one of a user identifier, a user first name, a user last name, a job title, a physical address, an email address, and information related to a social security number.

In some cases, one or more of the app(s) 825, the orchestrating agent 870, and the identity provider (or identity system 816) may support the use of a standard identity protocol for communications (shown as dataflow(s) 815), where the standard identity protocol comprises at least one of OpenID Connect (OIDC), Security Assertion Markup Language (SAML), and WebAuthn. Other standard identity protocols known in the art are contemplated in different embodiments, and the examples listed herein are not intended to be limiting. Furthermore, the orchestrating agent 870 may also leverage MFA for validating the user 881, for instance, with the identity cache module 891. In some cases, the orchestrating agent 870 retries communications with the cloud identity provider (e.g., identity system 816) and updates the available/unavailable status (if needed).

Thus, the orchestrating agent 870 facilitates in providing resiliency to identity-centric operations (e.g., user authentication and/or authorization) during an outage at a $3^{rd}$ party cloud identity provider (e.g., identity system 816). In some non-limiting examples, the outage may be a result of a hardware or software issue, regular/scheduled maintenance, internet outage, power outage (or blackout), a natural disaster (e.g., hurricane, floods, earthquake, etc.), a geopolitical event (e.g., strikes or riots, war), or any other event that causes the identity system 816 to temporarily go offline.

Figure 9:
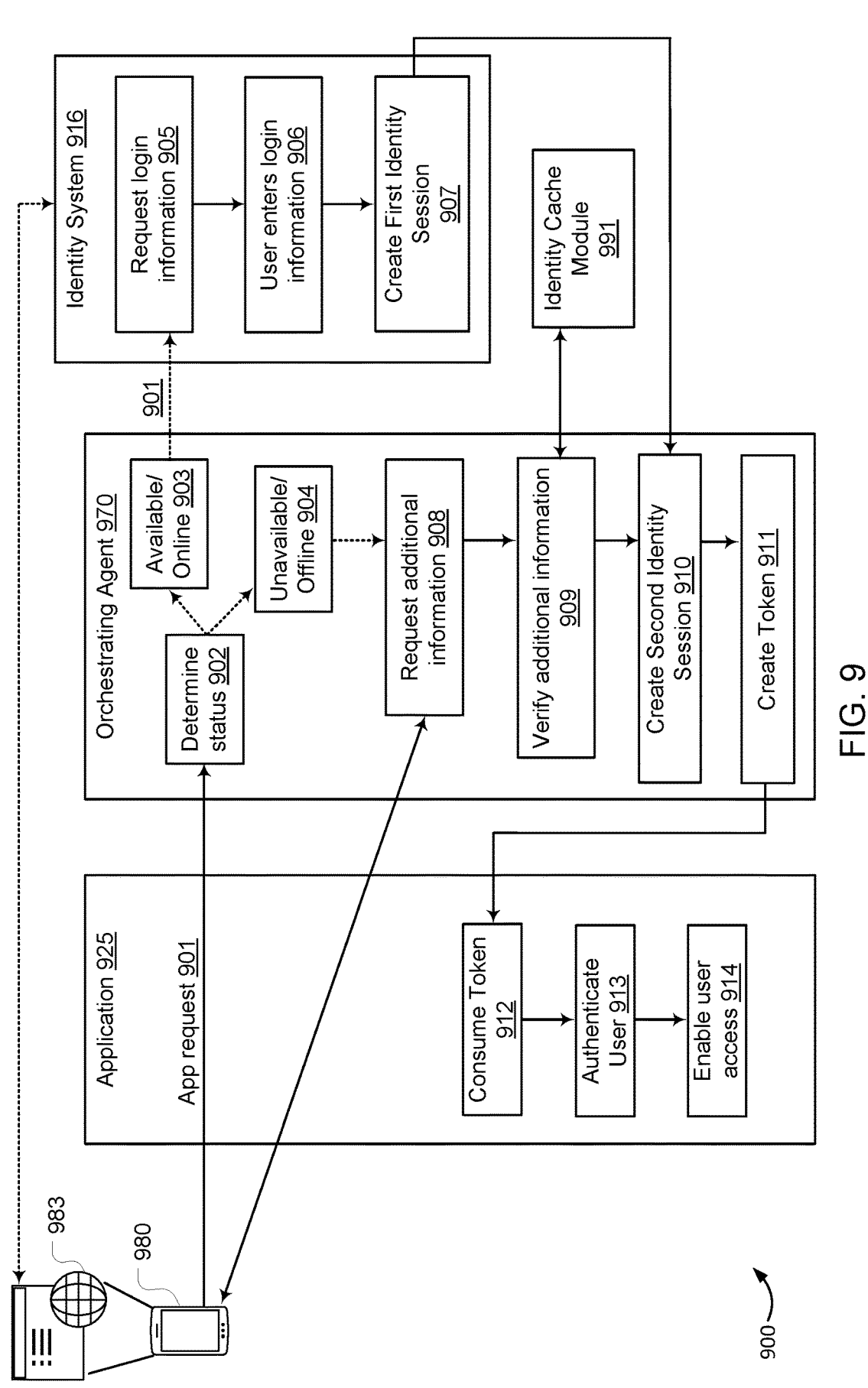
FIG. 9 illustrates a swim diagram for controlling user access to an application, according to various aspects of the disclosure.

FIG. 9 illustrates an example of a swim diagram 900 depicting a method for controlling user access to an application, according to various aspects of the disclosure. The swim diagram 900 described in relation to FIG. 9 implements one or more aspects of the process flow 800 in FIG. 8.

The swim diagram 900 may be implemented using a computing platform (or computing system) that may be similar or substantially similar to the system(s) 100, 300-*a*, and/or 300-*b*, previously described in relation to FIGS. 1, 3A, and/or 3B, respectively. In this example, the orchestrating agent 970 (or simply orchestrator 970) helps control user access to the application 925. The user (shown as user 881 in FIG. 8) may request to access the application 925 via the user device 980, where the app request (901) for accessing the app 925 is generated from a web browser 983 on the user device 980. In some cases, the user is not authenticated at the application 925. When the user is not authenticated at an application 925 (e.g., after a predetermined period of time), the app request (901) is intercepted or otherwise sent to the orchestrating agent 970. Alternatively, the original app request 901 may be sent directly to the orchestrating agent 970 to implement the method described in FIG. 9 and elsewhere herein. The orchestrating agent (or orchestrator 970) determines a status (902) of an identity system 916 (also shown as identity provider/system 816 in FIG. 8), where the identity system 916 is associated with the application 925. In some cases, the status comprises one of an available/online status (903), or an unavailable/offline status (904). If the identity system 916 is online, the orchestrating agent 970 forwards the app request (901) to the identity system 916. In this case, the identity system 916 (also referred to herein as an identity provider) begins the authentication process to validate the identity of the user associated with user device 980. For example, the identity systems 916 requests login information (905), such as, but not limited to, a username-password combination, from the user. Once the user enters the login information (906) or other applicable identity data, the identity system 916 processes it to validate the user's identity. Once validated, the identity system/provider 916 creates a first identity session (907) and relays information pertaining to the first identity session to the orchestrating agent 970 (also referred to as orchestrator 970, or an intermediary 970).

In other cases, for instance, if the orchestrating agent 970 determines that the identity system 916 comprises the unavailable/offline status (904), the orchestrating agent 970 transmits a request for additional information (908) to the user device 980 and verifies the additional information received from the user 881/user device 980 with the identity cache module 991. As noted above, the additional information requested by the orchestrating agent 970 (or intermediary 970) may include one or more of (1) requesting identity data, such as, login information from the user, where the login information includes at least a username and a password, (2) requesting answers to one or more security questions or challenge questions, and (3) requesting additional identity data from the user, where the additional identity data comprises at least one of a user identifier, a user first name, a user last name, a job title, a physical address, an email address, and information related to a social security number. The identity cache module 991 may be similar or substantially similar to the identity cache module 891 described in relation to FIG. 8 and may store a local cache of a subset of the identity data and/or identity metadata associated with a plurality of users and stored at the identity system 916. This enables the orchestrating agent 970 to reference the additional information received from the user with the cached identity information stored at the identity cache module 991, for instance, to enable user access to the application 925 even when the identity system 916 is offline. After receiving the additional information from the user, the orchestrating agent verifies the additional information (909), where the verifying comprises comparing the additional information received from the user with the cached identity data and/or identity metadata stored at the identity cache module 991.

In some cases, the orchestrating agent 970 proceeds to create a second identity session (910) based at least in part on (1) obtaining information pertaining to the first identity session from the identity system 916, i.e., if the identity provider is online/available, or (2) verifying the additional information (909). In one such embodiment, the second identity session may comprise the first identity session. The intermediary or orchestrating agent 970 then proceeds to "mint" or create a token (also referred to as the intermediary or orchestrator token to differentiate from the security tokens (if any) created at the identity provider). The orchestrating agent 970 passes the token to the application 925, for instance, in a SAML or OIDC response, where it is consumed before the user is granted access to the application 925. As seen, the application 925 consumes the token (912), authenticates the user (913), and enables user access (914) to the application, based at least in part on consuming the token received from the orchestrator 970.

Figure 7:
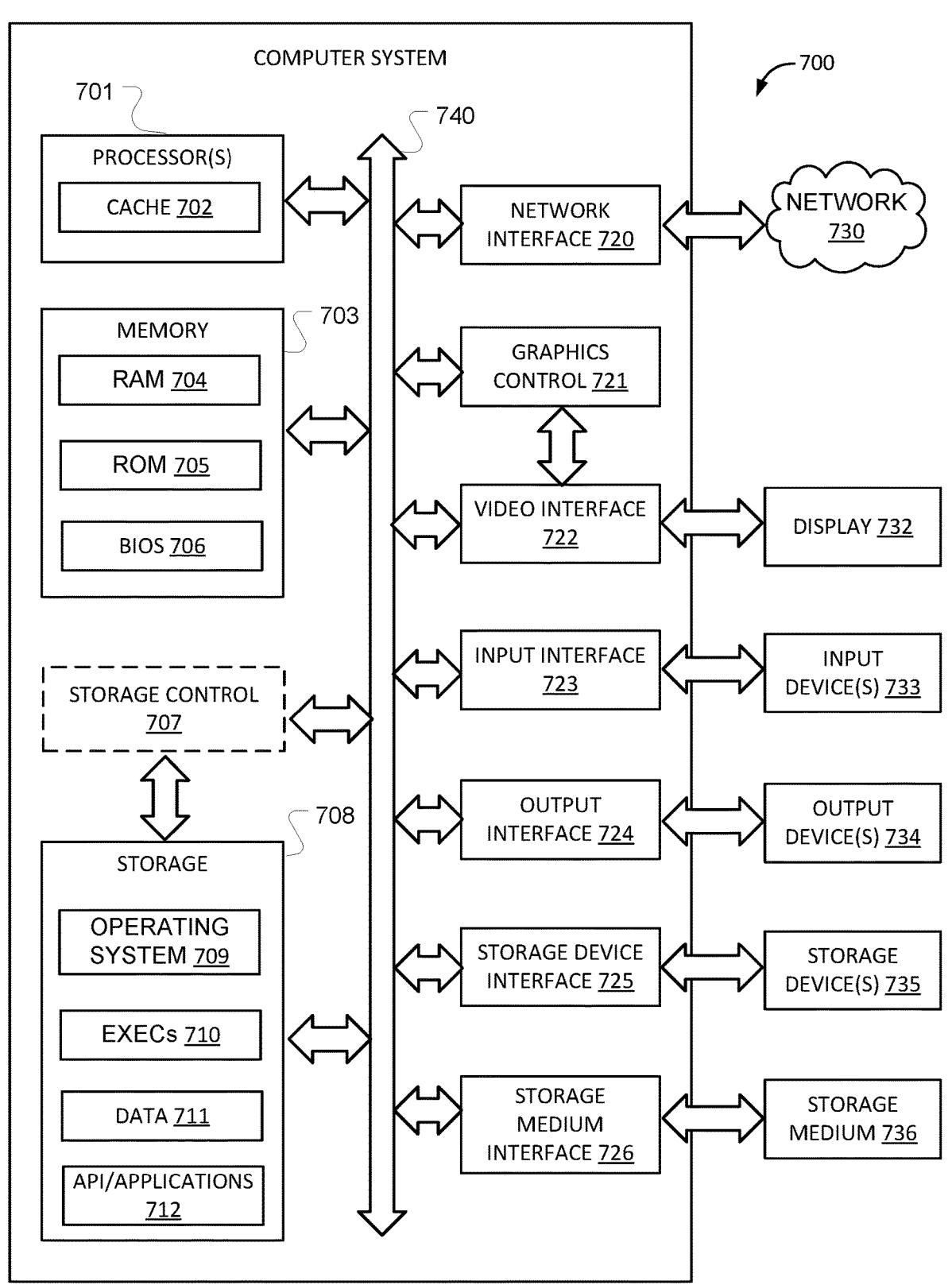
FIG. 7 illustrates a block diagram of a computing system, according to an embodiment of the disclosure.

FIG. 7 illustrates a diagrammatic representation of one embodiment of a computer system 700, within which a set of instructions can execute for causing a device to perform or execute any one or more of the aspects and/or methodologies of the present disclosure. The components in FIG. 7 are examples only and do not limit the scope of use or functionality of any hardware, software, firmware, embedded logic component, or a combination of two or more such components implementing particular embodiments of this disclosure. Some or all of the illustrated components can be part of the computer system 700. For instance, the computer system 700 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 700 includes at least a processor 701 such as a central processing unit (CPU) or a graphics processing unit (GPU) to name two non-limiting examples. Any of the subsystems described throughout this disclosure could embody the processor 701. The computer system 700 may also comprise a memory 703 and a storage 708, both communicating with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various non-transitory, tangible computer-readable storage media 736 with each other and/or with one or more of the processor 701, the memory 703, and the storage 708. All of these elements may interface directly or via one or more interfaces or adaptors to the bus 740. For instance, the various non-transitory, tangible computer-readable storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache memory unit 732 for temporary local storage of instructions, data, or computer addresses. Processor(s) 701 are configured to assist in execution of computer-readable instructions stored on at least one non-transitory, tangible computer-readable storage medium. Computer system 700 may provide functionality as a result of the processor(s) 701 executing software embodied in one or more non-transitory, tangible computer-readable storage media, such as memory 703, storage 708, storage devices 735, and/or storage medium 736 (e.g., read only memory (ROM)). Memory 703 may read the software from one or more other non-transitory, tangible computer-readable storage media (such as mass storage device(s) 735, 736) or from one or more other sources through a suitable interface, such as network interface 720. Any of the subsystems herein disclosed could include a network interface such as the network interface 720. The software may cause processor(s) 701 to carry out one or more processes or one or more steps of one or more processes described or illustrated herein. Carrying out such processes or steps may include defining data structures stored in memory 703 and modifying the data structures as directed by the software. In some embodiments, an FPGA can store instructions for carrying out functionality as described in this disclosure. In other embodiments, firmware includes instructions for carrying out functionality as described in this disclosure.

The memory 703 may include various components (e.g., non-transitory, tangible computer-readable storage media) including, but not limited to, a random-access memory component (e.g., RAM 704) (e.g., a static RAM "SRAM", a dynamic RAM "DRAM, etc.), a read-only component (e.g., ROM 707), and any combinations thereof. ROM 707 may act to communicate data and instructions unidirectionally to processor(s) 701, and RAM 704 may act to communicate data and instructions bidirectionally with processor(s) 701. ROM 707 and RAM 704 may include any suitable non-transitory, tangible computer-readable storage media. In some instances, ROM 707 and RAM 704 include non-transitory, tangible computer-readable storage media for carrying out a method. In one example, a basic input/output system 706 (BIOS), including basic routines that help to transfer information between elements within computer system 700, such as during start-up, may be stored in the memory 703.

Fixed storage 708 is connected bi-directionally to processor(s) 701, optionally through storage control unit 707. Fixed storage 708 provides additional data storage capacity and may also include any suitable non-transitory, tangible computer-readable media described herein. Storage 708 may be used to store operating system 707, EXECs 710 (executables), data 711, API applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus (also shown as bus 340 in FIG. 3B) may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, such as mobile devices and enterprise systems, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721. In addition to a display 732, computer system 700 may include one or more other peripheral output devices 734 including, but not limited to, an audio speaker, a printer, a check or receipt printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDER-BOLT port, and any combinations thereof.

In addition, or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 700 shown in FIG. 7 such as, but not limited to, the network 730, processor 701, memory 703, etc., may comprise a cloud computing system. In one such system, front-end systems such as input devices 733 may provide information to back-end platforms such as servers (e.g., computer systems 700) and storage (e.g., memory 703). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for controlling access to an application in an identity infrastructure, the system comprising:

one or more hardware processors configured by machine-readable instructions to:

request to access the application, wherein the application is associated with an identity system;

determine a status of the identity system, the status comprising one of an available status and an unavailable status, and when the status comprises the unavailable status, transmit a request for additional information, receive the additional information, and verify the additional information by referencing an identity cache associated with the identity system;

authenticate a user to access the application when at least one of:

the status comprises the available status, and the additional information has been verified;

in response to authenticating the user at the application, send a communication from the application to the user, granting the user access to the application; and store a subset of at least one of identity metadata and identity data associated with a plurality of users, including at least the user, to the identity cache, wherein the identity cache is at least one of electronically, logistically, logically, and communicatively coupled to the identity system and an orchestrating agent.

2. The system of claim 1, wherein, requesting to access the application comprises receiving the request at the orchestrating agent prior to determining a status of the identity system;

determining a status of the identity system comprises using the orchestrating agent to determine the status of the identity system; and when the status comprises the available status, authenticating the user comprises:

receiving at least some identity data at the identity system from the user, authenticating the user at the identity system based at least in part on the at least some identity data, and receiving a user authentication confirmation at the orchestrating agent.

3. The system of claim 2, wherein, verifying the additional information by referencing an identity cache comprises using the orchestrating agent to reference the identity cache associated with the identity system; and authenticating a user to access the application comprises creating a token at the orchestrating agent, wherein, the token is created based on one of:

receiving the user authentication confirmation at the orchestrating agent, and referencing the identity cache associated with the identity system using the orchestrating agent to reference the identity cache associated with the identity system.

4. The system of claim 3, wherein, in response to authenticating the user at the application, the one or more hardware processors are further configured by machine-readable instructions to: create a user session with the application.

5. The system of claim 3, wherein, the at least some identity data comprises at least one of a user identifier, a username, and a password; and the identity system creates a first identity session based at least in part on authenticating the user at the identity system.

6. The system of claim 5, wherein prior to creating the token at the orchestrating agent, the one or more hardware processors are configured by machine-readable instructions to: provide the orchestrating agent with information pertaining to the first identity session; and create, at the orchestrating agent, a second identity session, wherein the second identity session is created in response to the first identity session.

7. The system of claim 1, wherein transmitting the request for additional information comprises one or more of:

requesting at least some identity data from the user, the at least some identity data including at least a username and password;

requesting answers to one or more security questions; and requesting additional identity data from the user, wherein the additional identity data comprises at least one of a user identifier, a user first name, a user last name, a job title, a physical address, an email address, and information related to a social security number.

8. The system of claim 1, wherein, the subset of identity data comprises one or more of login information, one or more security questions, respective answers to each of the one or more security questions, and additional user data; and wherein the additional user data comprises at least one of a user identifier, a user first name, a user last name, a job title, a physical address, an email address, and information related to a social security number.

9. The system of claim 1, wherein, the one or more hardware processors are configured by machine-readable instructions to periodically sync the identity cache with the identity system via the orchestrating agent; and the identity system comprises a cloud-based identity system.

10. The system of claim 9, wherein the orchestrating agent comprises at least one of:

a standard identity protocol and multi-factor authentication (MFA), wherein the standard identity protocol comprising at least one of OpenID Connect (OIDC), Security Assertion Markup Language (SAML), and WebAuthn.;

a multi-factor authentication (MFA); and a combination thereof.

11. A method for controlling access to an application, comprising:

requesting to access the application, wherein the application is associated with an identity system;

determining a status of the identity system, the status comprising one of an available status and an unavailable status, and when the status comprises the unavailable status, transmitting a request for additional information, receiving the additional information, and verifying the additional information by referencing an identity cache associated with the identity system;

authenticating a user to access the application when at least one of:

the status comprises the available status, and the additional information has been verified;

in response to authenticating the user at the application, sending a communication from the application to the user, granting the user access to the application; and storing a subset of at least one of identity metadata and identity data associated with a plurality of users, including at least the user, to the identity cache, wherein the identity cache is at least one of electronically, logistically, logically, and communicatively coupled to the identity system and an orchestrating agent.

12. The method of claim 11, wherein, requesting to access the application comprises receiving the request at an intermediary prior to determining a status of the identity system;

determining a status of the identity provider comprises using the intermediary to determine the status of the identity system; and when the status comprises the available status, authenticating the user comprises:

receiving at least some identity data at the identity system from the user, authenticating the user at the identity system, based at least in part on the at least some identity data, and receiving a user authentication confirmation at the intermediary.

13. The method of claim 12, wherein, verifying the additional information by referencing an identity cache comprises using the intermediary to reference the identity cache associated with the identity system;

authenticating the user to access the application comprises creating a token at the intermediary;

wherein the token is created based on one of:

receiving the user authentication confirmation at the intermediary; and using the intermediary to reference the identity cache associated with the identity system; and in response to authenticating the user at the application, the method further comprises creating a user session with the application.

14. The method of claim 13, wherein the at least some identity data comprises at least one of a user identifier, a username, and a password, and wherein the identity system creates a first identity session based at least in part on authenticating the user at the identity system.

15. The method of claim 14, wherein prior to creating the token at the intermediary, the method comprises:

providing the intermediary with information pertaining to the first identity session; and creating, at the intermediary, a second identity session, wherein the second identity session is created in response to the first identity session.

16. The method of claim 11, wherein transmitting the request for additional information comprises one or more of:

requesting at least some identity data from the user, the at least some identity data including at least a username and password;

requesting answers to one or more security questions; and requesting additional identity data from the user, wherein the additional identity data comprises at least one of a user identifier, a user first name, a user last name, a job title, a physical address, an email address, and information related to a social security number.

17. The method of claim 11, wherein, the identity cache stores the subset of identity data;

the subset of identity data comprises one or more of login information, one or more security questions, respective answers to each of the one or more security questions, and additional user data;

the additional user data comprises at least one of a user identifier, a user first name, a user last name, a job title, a physical address, an email address, and information related to a social security number;

the identity cache is periodically synced with the identity system via an intermediary;

the identity system comprises a cloud-based identity system; and the orchestrating agent comprises at least one of:

a standard identity protocol, multi-factor authentication (MFA), and wherein the standard identity protocol comprising at least one of OpenID Connect (OIDC), Security Assertion Markup Language (SAML), and WebAuthn, a multi-factor authentication (MFA), and a combination thereof.

18. A non-transient computer-readable storage medium having instructions embodied thereon, the instructions being executable by one or more processors to perform a method for controlling access to an application, the method comprising:

requesting to access the application, wherein the application is associated with an identity system;

determining a status of the identity system, the status comprising one of an available status and an unavailable status, and when the status comprises the unavailable status, transmitting a request for additional information, receiving the additional information, and verifying the additional information by referencing an identity cache associated with the identity system;

authenticating a user to access the application when at least one of:

the status comprises the available status, and the additional information has been verified;

in response to authenticating the user at the application, sending a communication from the application to the user, granting the user access to the application; and storing a subset of at least one of identity metadata and identity data associated with a plurality of users, including at least the user, to the identity cache, wherein the identity cache is at least one of electronically, logistically, logically, and communicatively coupled to the identity system and an orchestrating agent.

* * * * *